US012487536B2

(12) United States Patent
Takeuchi et al.

(10) Patent No.: US 12,487,536 B2
(45) Date of Patent: Dec. 2, 2025

(54) ELECTROPHOTOGRAPHIC PHOTOSENSITIVE MEMBER, PROCESS CARTRIDGE, AND ELECTROPHOTOGRAPHIC APPARATUS, AND METHOD OF PRODUCING ELECTROPHOTOGRAPHIC PHOTOSENSITIVE MEMBER

(71) Applicant: CANON KABUSHIKI KAISHA, Tokyo (JP)

(72) Inventors: Eileen Takeuchi, Tokyo (JP); Jun Ohira, Ibaraki (JP); Naoto Kameyama, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 644 days.

(21) Appl. No.: 17/934,490

(22) Filed: Sep. 22, 2022

(65) Prior Publication Data

US 2023/0105110 A1 Apr. 6, 2023

(30) Foreign Application Priority Data

Sep. 28, 2021 (JP) ................................. 2021-157318
Feb. 14, 2022 (JP) ................................. 2022-020563

(51) Int. Cl.
*G03G 5/07* (2006.01)
*G03G 5/05* (2006.01)

(52) U.S. Cl.
CPC ......... *G03G 5/0764* (2020.05); *G03G 5/0539* (2013.01); *G03G 5/0589* (2013.01)

(58) Field of Classification Search
CPC ... G03G 5/0764; G03G 5/0539; G03G 5/0589
See application file for complete search history.

(56) References Cited

U.S. PATENT DOCUMENTS

2009/0180800 A1* 7/2009 Uesugi ............... G03G 5/14726 430/96
2019/0033734 A1 1/2019 Yoshizawa
(Continued)

FOREIGN PATENT DOCUMENTS

JP H06332219 A 12/1994
JP 2009104145 A 5/2009
(Continued)

*Primary Examiner* — Mark F. Huff
*Assistant Examiner* — Boone Alexander Evans
(74) *Attorney, Agent, or Firm* — Canon U.S.A., Inc. IP Division

(57) ABSTRACT

An electrophotographic photosensitive member including a surface layer, wherein the surface layer comprises a fluorine atom-containing resin particle, a binder material, and a polymer having a specific structural unit represented by the following formula (1):

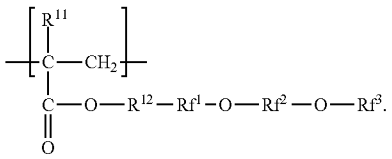

(1)

In formula (1) $R^{11}$ represents a hydrogen atom or a methyl group, $R^{12}$ represents a single bond or a methylene group, $Rf^1$ and $Rf^2$ each independently represent a perfluoroalkylene group having 1 to 3 carbon atoms, or a perfluoroalkylidene group having 1 to 3 carbon atoms, and $Rf^3$ represents a perfluoroalkyl group having 1 to 3 carbon atoms.

19 Claims, 5 Drawing Sheets

(56) References Cited

U.S. PATENT DOCUMENTS

| | | | | |
|---|---|---|---|---|
| 2020/0096883 | A1 | 3/2020 | Nonaka | |
| 2020/0233322 | A1* | 7/2020 | Choda | G03G 5/047 |
| 2021/0080843 | A1 | 3/2021 | Sasaki | |

FOREIGN PATENT DOCUMENTS

| | | | |
|---|---|---|---|
| JP | 2012189715 | A | 10/2012 |
| JP | 2021047236 | A | 3/2021 |

* cited by examiner

ELECTROPHOTOGRAPHIC PHOTOSENSITIVE MEMBER, PROCESS CARTRIDGE, AND ELECTROPHOTOGRAPHIC APPARATUS, AND METHOD OF PRODUCING ELECTROPHOTOGRAPHIC PHOTOSENSITIVE MEMBER

BACKGROUND OF THE INVENTION

Field of the Invention

The present disclosure relates to an electrophotographic photosensitive member, and a process cartridge and an electrophotographic apparatus each including the electrophotographic photosensitive member, and to a method of producing the electrophotographic photosensitive member.

Description of the Related Art

As an electrophotographic photosensitive member to be mounted onto an electrophotographic apparatus, there is widely used an electrophotographic photosensitive member containing an organic photoconductive substance (charge-generating substance). In recent years, an improvement in mechanical durability (abrasion resistance) of the electrophotographic photosensitive member has been required for the purposes of lengthening the lifetime of the electrophotographic photosensitive member and improving image quality at the time of its repeated use.

An example of a technology of improving the abrasion resistance of the electrophotographic photosensitive member is a method including incorporating fluorine atom-containing resin particles into the surface layer of the electrophotographic photosensitive member to reduce friction between the surface layer and a contact member such as a cleaning blade. In Japanese Patent Application Laid-Open No. H06-332219, there is a disclosure of a technology including forming a surface layer through use of a dispersion liquid of fluorine atom-containing resin particles such as polytetrafluoroethylene resin particles as a coating liquid for a surface layer.

In addition, at the time of the preparation of the dispersion liquid of the fluorine atom-containing resin particles, there has been known a method including using a (meth)acrylic polymer containing a fluorine atom as a dispersant for the fluorine atom-containing resin particles for the purpose of improving their dispersibility. In each of Japanese Patent Application Laid-Open No. 2012-189715 and Japanese Patent Application Laid-Open No. 2009-104145, there is a disclosure of a technology of improving the dispersibility of the fluorine atom-containing resin particles through use of a fluorine atom-containing (meth)acrylic polymer having a specific structure as a dispersant.

In Japanese Patent Application Laid-Open No. 2021-47236, there is a disclosure of an electrophotographic photosensitive member including an outermost surface layer containing a fluorine-based graft polymer and fluorine-containing resin particles, in which the fluorine-based graft polymer contains a structural unit having an acidic group having a pKa of 3 or less.

However, in each of the technologies disclosed in Japanese Patent Application Laid-Open No. 2012-189715 and Japanese Patent Application Laid-Open No. 2009-104145, at the time of repeated use of an electrophotographic photosensitive member, a potential fluctuation cannot be sufficiently suppressed in some cases, though a surface layer excellent in dispersibility of the fluorine atom-containing resin particles is obtained. In particular, each of the technologies has involved a problem in that a potential fluctuation at the time of long-term repeated use of an electrophotographic photosensitive member including a surface layer excellent in abrasion resistance for the purpose of lengthening its lifetime is large. Accordingly, each of the technologies has been susceptible to improvement in terms of suppression of the potential fluctuation at the time of the repeated use of the electrophotographic photosensitive member.

SUMMARY OF THE INVENTION

One aspect of the present disclosure is directed to providing an electrophotographic photosensitive member suppressed from causing a potential fluctuation at the time of its repeated use.

In addition, another aspect of the present disclosure is directed to providing a process cartridge including the electrophotographic photosensitive member and an electrophotographic apparatus including the process cartridge.

In addition, another aspect of the present disclosure is directed to providing a method of producing the electrophotographic photosensitive member.

According to one aspect of the present disclosure, there is provided an electrophotographic photosensitive member including a surface layer, wherein the surface layer comprises a fluorine atom-containing resin particle, a binder material, and a polymer A having a structural unit represented by the following formula (1), and wherein the polymer A is free of a constituent unit having an acidic group having a pKa of 3 or less:

(1)

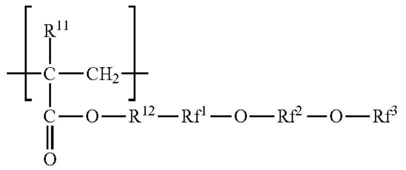

where, in the formula (1), $R^{11}$ represents a hydrogen atom or a methyl group, $R^{12}$ represents a single bond or a methylene group, $Rf^1$ and $Rf^2$ each independently represent a perfluoroalkylene group having 1 to 3 carbon atoms, or a perfluoroalkylidene group having 1 to 3 carbon atoms, and $Rf^3$ represents a perfluoroalkyl group having 1 to 3 carbon atoms.

The surface layer is preferably free of a polymer having a structural unit having an acidic group having a pKa of 3 or less.

In addition, according to another aspect of the present disclosure, there is provided a process cartridge including: the electrophotographic photosensitive member; and at least one unit selected from the group consisting of: a charging unit; a developing unit; and a cleaning unit, the process cartridge integrally supporting the electrophotographic photosensitive member and the at least one unit, and being detachably attachable to a main body of an electrophotographic apparatus.

In addition, according to another aspect of the present disclosure, there is provided an electrophotographic apparatus including: the electrophotographic photosensitive member; a charging unit; an exposing unit; a developing unit; and a transferring unit.

In addition, according to another aspect of the present disclosure, there is provided a method of producing the electrophotographic photosensitive member.

Further features of the present disclosure will become apparent from the following description of exemplary embodiments with reference to the attached drawings.

DESCRIPTION OF THE EMBODIMENTS

Figure 1:
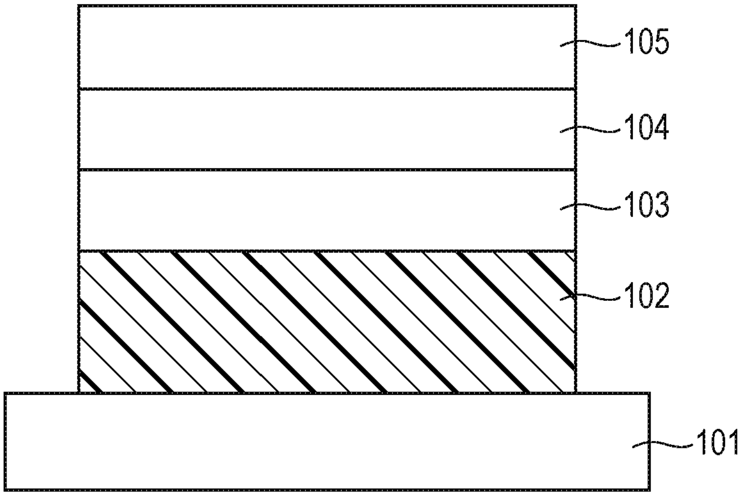
FIG. 1 is a schematic view for illustrating an example of the configuration of an electrophotographic photosensitive member.

Example embodiments of the present disclosure will now be described in detail in accordance with the accompanying drawings.

The inventors have made investigations, and as a result, have found that when fluorine atom-containing resin particles, a binder material, and a polymer A having a structural unit represented by the following formula (1) are incorporated into the surface layer of an electrophotographic photosensitive member, an electrophotographic photosensitive member, which is excellent in dispersibility of the fluorine atom-containing resin particles in its surface layer and is suppressed from causing a potential fluctuation at the time of its repeated use, is obtained:

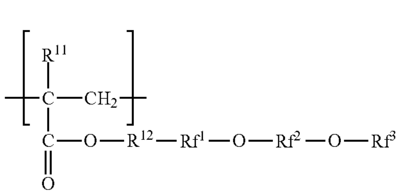

(1)

where, in the formula (1), $R^{11}$ represents a hydrogen atom or a methyl group, $R^2$ represents a single bond or a methylene group, $Rf^1$ and $Rf^2$ each independently represent a perfluoroalkylene group having 1 to 3 carbon atoms, or a perfluoroalkylidene group having 1 to 3 carbon atoms, and $Rf^3$ represents a perfluoroalkyl group having 1 to 3 carbon atoms.

The polymer A is free of a structural unit having an acidic group having a pKa of 3 or less.

Although the surface layer may contain a polymer having a structural unit having an acidic group having a pKa of 3 or less, or may be free of the polymer, the layer is preferably free of the polymer.

The pKa of the acidic group is determined by measurement including using a known method such as titration. Examples of the acidic group having a pKa of 3 or less include a sulfonic acid group (methanesulfonic acid: −2.6), a phosphonic acid group (first dissociation: 1.5), a phosphoric acid group (first dissociation: 2.12), and a fluoroalkyl carboxylic acid group (e.g., trifluoroacetic acid: −0.25, difluoroacetic acid: 1.24, or monofluoroacetic acid: 2.66).

Herein, the inventors have conceived that the polymer A having the structural unit represented by the formula (1) serves as a dispersant for the fluorine atom-containing resin particles in a step of preparing a coating liquid for a surface layer for forming the surface layer of the electrophotographic photosensitive member.

The inventors have assumed the reason why the electrophotographic photosensitive member of the present disclosure is excellent in dispersibility of the fluorine atom-containing resin particles in its surface layer, and is excellent in potential fluctuation-suppressing effect at the time of its repeated use to be as described below.

An electrophotographic photosensitive member including a surface layer containing fluorine atom-containing resin particles and a dispersant tends to show a large potential fluctuation at the time of its repeated use. This is probably because charge is liable to accumulate on the $-(CF_2)_n-$ chain of the dispersant adhering to the fluorine atom-containing resin particles incorporated into the surface layer.

The inventors have made investigations, and as a result, have found that when, at the time of the incorporation of the polymer having a structural unit including the $-(CF_2)_n-$ chain into the surface layer, an oxygen atom is caused to exist between the $-(CF_2)_n-$ chain and another $-(CF_2)_n-$ chain, a suppressing effect on charge trapping is obtained. However, as the number of the carbon atoms of the $-(CF_2)_n-$ chain becomes larger, charge is more liable to accumulate thereon, and hence a potential fluctuation-suppressing effect is not sufficiently obtained in some cases.

In view of the foregoing, the inventors have made further investigations, and as a result, have found that the incorporation of the polymer A having the structural unit represented by the formula (1) into the surface layer provides an electrophotographic photosensitive member, which is suppressed from causing charge trapping and is suppressed from causing a potential fluctuation at the time of its repeated use.

In the formula (1), $Rf^1$ and $Rf^2$ are each caused to represent a perfluoroalkylene group having 1 to 3 carbon atoms, or a perfluoroalkylidene group having 1 to 3 carbon atoms, and $Rf^3$ is caused to represent a perfluoroalkyl group having 1 to 3 carbon atoms. Such setting may be capable of suppressing charge accumulation in the structural unit represented by the formula (1). In addition, when $R^{12}$ in the formula (1) is caused to represent a single bond or a methylene group, a difference in surface energy between the structural unit represented by the formula (1) and the fluorine atom-containing resin particles may become smaller to facilitate the adhesion of the unit to the fluorine atom-containing resin particles.

<Fluorine Atom-Containing Resin Particles>

The surface layer of the electrophotographic photosensitive member of the present disclosure contains the fluorine atom-containing resin particles. The content of the fluorine atom-containing resin particles in the surface layer is preferably from 5 mass % to 40 mass % with respect to the total mass of the surface layer.

Examples of a resin to be incorporated into the fluorine atom-containing resin particles to be used in the present disclosure include a polytetrafluoroethylene resin, a polychlorotrifluoroethylene resin, a polytetrafluoroethylene propylene resin, a polyvinyl fluoride resin, a polyvinylidene fluoride resin, and a polydichlorodifluoroethylene resin. In addition, particles containing a plurality of kinds of the above-mentioned resins are also preferably used. Of those, a polytetrafluoroethylene (PTFE) resin is more preferred as the fluorine atom-containing resin particles from the viewpoint of an improvement in dispersibility of the particles.

In the observation of a section of the surface layer, the arithmetic average of the long diameters of primary particles (average primary particle diameter) measured from the secondary electron image of the fluorine atom-containing resin particles obtained with a scanning electron microscope is preferably from 150 nm to 300 nm from the viewpoints of an improvement in dispersibility of the particles and the suppression of a potential fluctuation. Further, the average primary particle diameter of the fluorine atom-containing resin particles is more preferably from 180 nm to 250 nm.

The average of circularities (average circularity) calculated from the areas and perimeters of the primary particles measured from the secondary electron image of the fluorine atom-containing resin particles obtained with the scanning electron microscope is preferably 0.75 or more.

To cause the measured values of the average primary particle diameter and average circularity of the fluorine atom-containing resin particles in the surface layer of the electrophotographic photosensitive member of the present disclosure to fall within the above-mentioned ranges, such fluorine atom-containing resin particles that the values of their average primary particle diameter and average circularity measured and calculated by the following methods fall within the ranges may be used.

(Methods of Measuring Average Primary Particle Diameter and Average Circularity)

That is, in each of Examples of the present disclosure, the average particle diameter and average circularity of fluorine atom-containing resin particles to be incorporated into the surface layer of an electrophotographic photosensitive member were measured with a field emission scanning electron microscope (FE-SEM) as described below. The fluorine atom-containing resin particles were caused to adhere to a commercial carbon electroconductive tape, and the fluorine atom-containing resin particles that did not adhere to the electroconductive tape were removed with compressed air, followed by the deposition of platinum from the vapor onto the remaining particles. The fluorine atom-containing resin particles having deposited thereonto platinum were observed with a FE-SEM manufactured by Hitachi High-Technologies Corporation (S-4700). Conditions for the measurement with the FE-SEM are as described below.

Acceleration voltage: 2 kV

WD: 5 mm

Magnification: 20,000

Number of pixels: 1,280 pixels in a longitudinal direction and 960 pixels in a lateral direction (size per pixel: 5 nm)

The Feret diameters of 100 particles were determined from the resultant image with ImageJ (open source software manufactured by the National Institutes of Health (NIH)), and their average was calculated and used as the average particle diameter.

In addition, the areas and perimeters of the particles were similarly determined, and the circularities thereof were determined from the following equation (II). The average of the circularities was calculated and used as the average circularity.

$$\text{Circularity}=4\times\pi\times(\text{area})/(\text{square of perimeter}) \qquad \text{Equation (II)}$$

The fluorine atom-containing resin particles of the present disclosure may be used alone or in combination thereof.

<Polymer a Having Structural Unit Represented by Formula (1)>

The surface layer of the electrophotographic photosensitive member of the present disclosure contains the polymer A having the structural unit represented by the following formula (1).

(1)

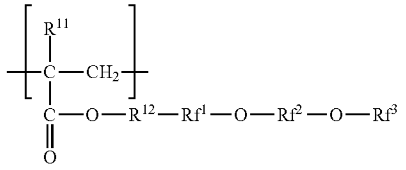

In the formula (1), $R^{11}$ represents a hydrogen atom or a methyl group. $R^{12}$ represents a single bond or a methylene group. When $R^{11}$ is caused to represent an alkylene group having 2 or more carbon atoms, the difference in surface energy between the structural unit represented by the formula (1) and the fluorine atom-containing resin particles becomes larger. Accordingly, it becomes difficult for the unit to sufficiently adhere to the fluorine atom-containing resin particles, and hence their dispersibility is liable to be insufficient. $Rf^1$ and $Rf^2$ each independently represent a perfluoroalkylene group having 1 to 3 carbon atoms, or a perfluoroalkylidene group having 1 to 3 carbon atoms. $Rf^3$ represents a perfluoroalkyl group having 1 to 3 carbon atoms. When the number of the carbon atoms of each of $Rf^1$ to $Rf^3$ is set to 4 or more, charge accumulation in the structural unit represented by the formula (1) cannot be sufficiently suppressed, and hence a potential fluctuation cannot be sufficiently suppressed at the time of repeated use of the electrophotographic photosensitive member.

In addition, in the formula (1), the total number of the carbon atoms of $Rf^1$ to $Rf^3$ is preferably from 6 to 9 from the viewpoint of an improvement in dispersibility of the fluorine atom-containing resin particles. Further, the total number of the carbon atoms of $Rf^1$ to $Rf^3$ is more preferably from 6 to 8 from the viewpoint of the suppression of a potential fluctuation.

Examples of the structural unit represented by the formula (1) to be incorporated into the polymer A having the structural unit represented by the formula (1) to be used in the present disclosure include structures shown in Table 1 below.

TABLE 1

| Exemplified Compound | Structural unit represented by formula (1) | | | | | Total number of carbon atoms |
|---|---|---|---|---|---|---|
| No. | $R^{11}$ | $R^{12}$ | $Rf^1$ | $Rf^2$ | $Rf^3$ | of $Rf^1$ to $Rf^3$ |
| (1-1) | $-H$ | Single bond | $-CF_2-CF_2-$ | $-CF_2-CF_2-$ | $-CF_2-CF_3$ | 6 |
| (1-2) | $-CH_3$ | Single bond | $-CF_2-CF_2-$ | $-CF_2-CF_2-$ | $-CF_2-CF_3$ | 6 |
| (1-3) | $-H$ | $-CH_2-$ | $-CF_2-CF_2-$ | $-CF_2-CF_2-$ | $-CF_2-CF_3$ | 6 |
| (1-4) | $-CH_3$ | $-CH_2-$ | $-CF_2-CF_2-$ | $-CF_2-CF_2-$ | $-CF_2-CF_3$ | 6 |
| (1-5) | $-H$ | Single bond | 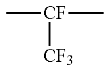 | 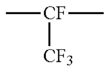 | $-CF_2-CF_2-CF_3$ | 7 |
| (1-6) | $-CH_3$ | Single bond | 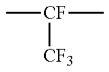 | 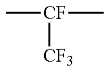 | $-CF_2-CF_2-CF_3$ | 7 |
| (1-7) | $-H$ | $-CH_2-$ | 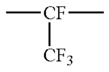 | 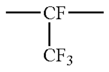 | $-CF_2-CF_2-CF_3$ | 7 |
| (1-8) | $-CH_3$ | $-CH_2-$ | 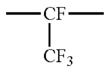 | 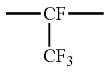 | $-CF_2-CF_2-CF_3$ | 7 |
| (1-9) | $-H$ | Single bond | 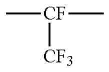 | 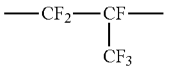 | $-CF_2-CF_2-CF_3$ | 8 |
| (1-10) | $-CH_3$ | Single bond | 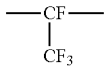 | 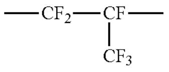 | $-CF_2-CF_2-CF_3$ | 8 |
| (1-11) | $-H$ | $-CH_2-$ | 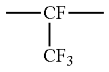 | 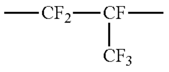 | $-CF_2-CF_2-CF_3$ | 8 |
| (1-12) | $-CH_3$ | $-CH_2-$ | 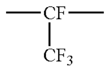 | 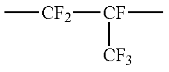 | $-CF_2-CF_2-CF_3$ | 8 |
| (1-13) | $-H$ | Single bond | 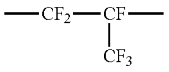 | 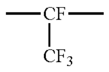 | $-CF_2-CF_2-CF_3$ | 8 |
| (1-14) | $-CH_3$ | Single bond | 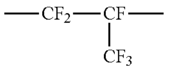 | 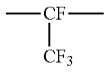 | $-CF_2-CF_2-CF_3$ | 8 |
| (1-15) | $-H$ | $-CH_2-$ | 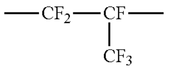 | 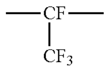 | $-CF_2-CF_2-CF_3$ | 8 |
| (1-16) | $-CH_3$ | $-CH_2-$ | 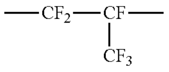 | 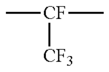 | $-CF_2-CF_2-CF_3$ | 8 |
| (1-17) | $-H$ | Single bond | 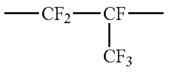 | 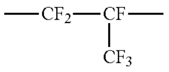 | $-CF_2-CF_2-CF_3$ | 9 |
| (1-18) | $-CH_3$ | Single bond | 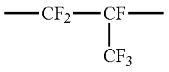 | 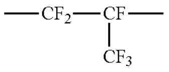 | $-CF_2-CF_2-CF_3$ | 9 |
| (1-19) | $-H$ | $-CH_2-$ | 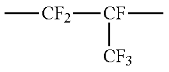 | 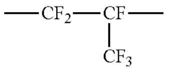 | $-CF_2-CF_2-CF_3$ | 9 |
| (1-20) | $-CH_3$ | $-CH_2-$ | 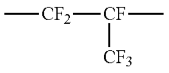 | 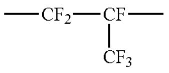 | $-CF_2-CF_2-CF_3$ | 9 |

The content of the structural unit represented by the formula (1) out of the polymer A to be incorporated into the surface layer of the electrophotographic photosensitive member of the present disclosure is preferably from 5 number % to 95 number % (from 0.1 mass % to 80 mass %) with respect to all the structural units of the polymer A from the viewpoint of an improvement in dispersibility of the fluorine atom-containing resin particles. Further, the content of the structural unit represented by the formula (1) is more preferably from 50 number % to 95 number % (from 1 mass % to 80 mass %) with respect to all the structural units of the polymer A. Further, the content of the structural unit represented by the formula (1) is still more preferably from 70 number % to 90 number % (from 4 mass % to 66 mass %) with respect to all the structural units of the polymer A.

The weight-average molecular weight of the polymer A having the structural unit represented by the formula (1) to be incorporated into the surface layer of the electrophotographic photosensitive member of the present disclosure is preferably from 16,000 to 100,000 from the viewpoints of an improvement in dispersibility of the fluorine atom-containing resin particles and the suppression of a potential fluctuation. Further, the weight-average molecular weight of the polymer A having the structural unit represented by the formula (1) is more preferably from 18,000 to 80,000.

The weight-average molecular weight of the polymer A having the structural unit represented by the formula (1) may be measured and calculated by the following method.

(Measurement of Weight-Average Molecular Weight by GPC)

The weight-average molecular weight according to the present disclosure is measured by gel permeation chromatography (GPC) as described below.

First, a sample is dissolved in tetrahydrofuran (THF) at room temperature over 24 hours. Then, the resultant solution is filtered with a solvent-resistant membrane filter "Myshoridisk" (manufactured by Tosoh Corporation) having a pore diameter of 0.2 m to provide a sample solution. The concentration of a THF-soluble component in the sample solution is adjusted to about 0.8 mass %. Measurement is performed with the sample solution under the following conditions.

Apparatus: HLC 8120 GPC (detector: RI) (manufactured by Tosoh Corporation)

Column: Septuplicate of Shodex KF-801, 802, 803, 804, 805, 806, and 807 (manufactured by Showa Denko K.K.)

Eluent: Tetrahydrofuran (THF)

Flow rate: 1.0 ml/min

Oven temperature: 40.0° C.

Sample injection amount: 0.10 ml

At the time of the calculation of the molecular weight of the sample, a molecular weight calibration curve prepared with standard polystyrene resins (e.g., product names "TSK Standard Polystyrenes F-850, F-450, F-288, F-128, F-80, F-40, F-20, F-10, F-4, F-2, F-1, A-5000, A-2500, A-1000, and A-500" manufactured by Tosoh Corporation) is used.

The content of the polymer A having the structural unit represented by the formula (1) with respect to the fluorine atom-containing resin particles in the surface layer is preferably from 2 mass % to 10 mass % from the viewpoints of an improvement in dispersibility of the particles and the suppression of a potential fluctuation. Further, the content of the polymer A having the structural unit represented by the formula (1) with respect to the fluorine atom-containing resin particles in the surface layer is more preferably from 4 mass % to 8 mass % from the viewpoints of an improvement in dispersibility of the particles and the suppression of a potential fluctuation.

The polymer A is preferably a polymer having the structural unit represented by the formula (1) and a structural unit represented by the following formula (2):

(2)

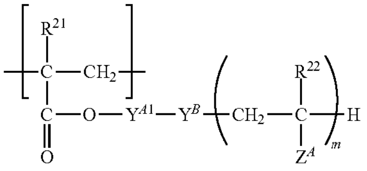

where, in the formula (2), $Y^{A1}$ represents an unsubstituted alkylene group, $Y^B$ represents an unsubstituted alkylene group, an alkylene group substituted with a halogen atom, an alkylene group substituted with a hydroxy group, an ester bond (—COO—), an amide bond (—NHCO—), or a urethane bond (—NHCOO—), or a divalent linking group that may be derived by combining one or more kinds of these groups or bonds, and —O— or —S—, or a single bond, $Z^A$ represents a structure represented by the formula (2A), a cyano group, or a phenyl group, $R^{21}$ and $R^{22}$ each independently represent a hydrogen atom or a methyl group, and "m" represents an integer of from 25 to 150;

(2A)

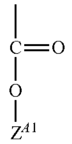

where, in the formula (2A), $Z^{A1}$ represents an alkyl group having 1 to 4 carbon atoms.

When $Y^B$ in the formula (2) represents an ester bond, —$Y^{A1}$—$Y^B$—$CH_2$— may be any one of —$Y^{A1}$—CO—O—$CH_2$— and —$Y^{A1}$—O—CO—$CH_2$—, and is preferably —$Y^{A1}$—CO—O—$CH_2$—. In addition, when $Y^B$ in the formula (2) represents an amide bond, —$Y^{A1}$—$Y^B$—$CH_2$— may be any one of —$Y^{A1}$—NH—CO—$CH_2$— and —$Y^{A1}$—CO—NH—$CH_2$—, and is preferably —$Y^{A1}$—NH—CO—$CH_2$—. In addition, when $Y^B$ in the formula (2) represents a urethane bond, —$Y^{A1}$—$Y^B$—$CH_2$— may be any one of —$Y^{A1}$—NH—CO—O—$CH_2$— and —$Y^{A1}$—O—CO—NH—$CH_2$—, and is preferably —$Y^{A1}$—NH—CO—O—$CH_2$—.

In addition, —$Y^{A1}$—$Y^B$— in the formula (2) preferably has a structure represented by —$Y^{A1}$—$(Y^{A2})_b$—$(Y^{A3})_c$—$(Y^{A4})_d$—$(Y^{A5})_e$—$(Y^{A6})_f$— where $Y^{A1}$ represents an unsubstituted alkylene group, $Y^{A2}$ represents a methylene group substituted with at least one selected from the group consisting of: a hydroxy group; and a halogen atom, $Y^{A3}$ represents an unsubstituted alkylene group, $Y^{A4}$ represents an ester bond, an amide bond, or a urethane bond, $Y^{A5}$ represents an unsubstituted alkylene group, $Y^{A6}$ represents an oxygen atom or a sulfur atom, and "b", "c", "d", "e", and "f" each independently represent 0 or 1.

The polymer A preferably has only the structural unit represented by the formula (1) and the structural unit represented by the formula (2) as its structural units.

It is preferred that

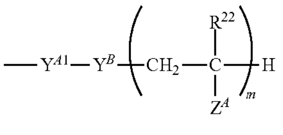

in the formula (2) be not an acidic group having a pKa of 3 or less.

It is preferred that

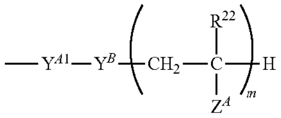

in the formula (2) be not —$SO_3H$.

In the polymer A having the structural unit represented by the formula (1) and the structural unit represented by the formula (2), a ratio between the structural unit represented by the formula (1) and the structural unit represented by the formula (2) is preferably from 1:19 to 19:1, more preferably from 1:1 to 19:1, still more preferably from 7:3 to 9:1 in terms of molar ratio.

Examples of the structural unit represented by the formula (2) include units having structures shown in Table 2 below.

TABLE 2

| | Structural unit represented by formula (2) | | | | | | |
|---|---|---|---|---|---|---|---|
| No. | $R^{21}$ | $R^{22}$ | $Y^{A1}$ | $Y^B$ | $Z^A$ | $Z^{A1}$ | *m* |
| u2-1 | —$CH_3$ | —$CH_3$ | —$CH_2$— | 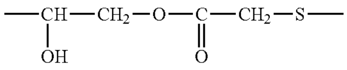 | Formula (2A) | —$CH_3$ | 60 |
| u2-2 | —$CH_3$ | —$CH_3$ | —$CH_2$— | 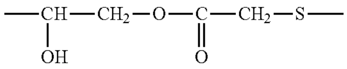 | Formula (2A) | —$CH_3$ | 25 |
| u2-3 | —$CH_3$ | —$CH_3$ | —$CH_2$— | 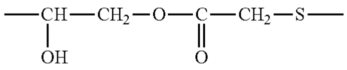 | Formula (2A) | —$CH_3$ | 150 |
| u2-4 | —$CH_3$ | —H | —$CH_2$— | 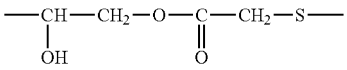 | Formula (2A) | —$CH_3$ | 60 |
| u2-5 | —H | —$CH_3$ | —$CH_2$— | 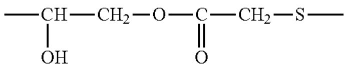 | Formula (2A) | —$CH_3$ | 60 |
| u2-6 | —H | —H | —$CH_2$— | 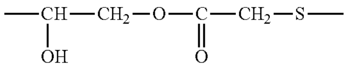 | Formula (2A) | —$CH_3$ | 60 |
| u2-7 | —$CH_3$ | —$CH_3$ | —$CH_2$—$CH_2$— | 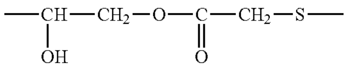 | Formula (2A) | —$CH_3$ | 60 |
| u2-8 | —$CH_3$ | —$CH_3$ | —$CH_2$— | 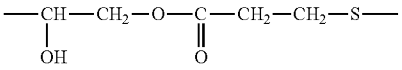 | Formula (2A) | —$CH_3$ | 60 |
| u2-9 | —$CH_3$ | —$CH_3$ | —$CH_2$—$CH_2$— | 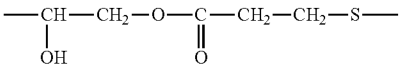 | Formula (2A) | —$CH_3$ | 60 |
| u2-10 | —$CH_3$ | —$CH_3$ | —$CH_2$— | 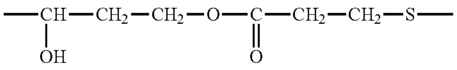 | Formula (2A) | —$CH_3$ | 60 |
| u2-11 | —$CH_3$ | —$CH_3$ | —$CH_2$—$CH_2$— | 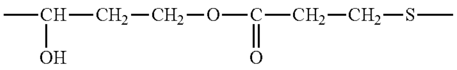 | Formula (2A) | —$CH_3$ | 60 |
| u2-12 | —$CH_3$ | —$CH_3$ | —$CH_2$— | 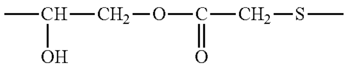 | Formula (2A) | —$CH_2$—$CH_3$ | 60 |
| u2-13 | —$CH_3$ | —$CH_3$ | —$CH_2$— | 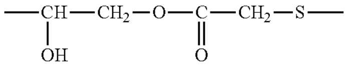 | Formula (2A) | —$CH_2CH_2CH_2CH_3$ | 60 |
| u2-14 | —$CH_3$ | —H | —$CH_2$— | 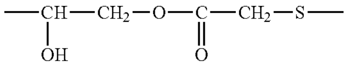 | Formula (2A) | —$CH_2CH_2CH_2CH_3$ | 60 |
| u2-15 | —$CH_3$ | —$CH_3$ | —$CH_2$— | 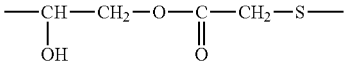 | Formula (2A) | —$CH_2CH(CH_3)_2$ | 60 |

TABLE 2-continued

| | Structural unit represented by formula (2) | | | | | | |
|---|---|---|---|---|---|---|---|
| No. | $R^{21}$ | $R^{22}$ | $Y^{A1}$ | $Y^B$ | $Z^A$ | $Z^{A1}$ | m |
| u2-16 | $-CH_3$ | $-H$ | $-CH_2-$ | 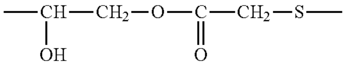 | Formula (2A) | $-CH_2CH(CH_3)_2$ | 60 |
| u2-17 | $-CH_3$ | $-CH_3$ | $-CH_2-$ | 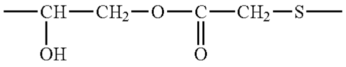 | Formula (2A) | $-C(CH_3)_3$ | 60 |
| u2-18 | $-CH_3$ | $-H$ | $-CH_2-$ | 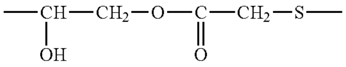 | Formula (2A) | $-C(CH_3)_3$ | 60 |
| u2-19 | $-CH_3$ | $-H$ | $-CH_2-$ | 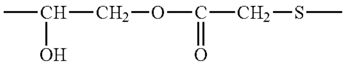 | Phenyl group | — | 60 |
| u2-20 | $-CH_3$ | $-H$ | $-CH_2-$ | 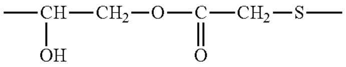 | Cyano group | — | 60 |
| u2-21 | $-CH_3$ | $-CH_3$ | $-CH_2-CH_2-$ | 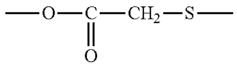 | Formula (2A) | $-CH_3$ | 60 |
| u2-22 | $-CH_3$ | $-CH_3$ | $-CH_2-CH_2-$ | 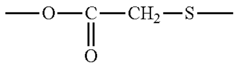 | Formula (2A) | $-CH_3$ | 60 |
| u2-23 | $-H$ | $-CH_3$ | $-CH_2-CH_2-$ | 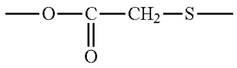 | Formula (2A) | $-CH_3$ | 60 |
| u2-24 | $-CH_3$ | $-CH_3$ | $-CH_2-$ | 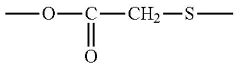 | Formula (2A) | $-CH_3$ | 60 |
| u2-25 | $-CH_3$ | $-CH_3$ | $-CH_2CH_2CH_2CH_2-$ | 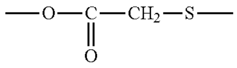 | Formula (2A) | $-CH_3$ | 60 |
| u2-26 | $-CH_3$ | $-CH_3$ | $-CH_2-CH_2-$ | 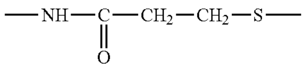 | Formula (2A) | $-CH_3$ | 60 |
| u2-27 | $-H$ | $-CH_3$ | $-CH_2-CH_2-$ | 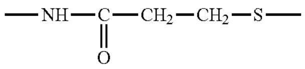 | Formula (2A) | $-CH_3$ | 60 |
| u2-28 | $-CH_3$ | $-CH_3$ | $-CH_2-CH_2-$ | 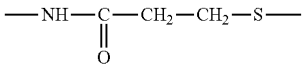 | Formula (2A) | $-CH_3$ | 60 |
| u2-29 | $-CH_3$ | $-CH_3$ | $-CH_2-CH_2-$ | 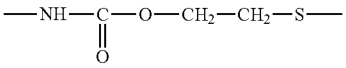 | Formula (2A) | $-CH_3$ | 60 |
| u2-30 | $-H$ | $-CH_3$ | $-CH_2-CH_2-$ | 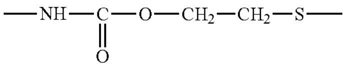 | Formula (2A) | $-CH_3$ | 60 |
| u2-31 | $-CH_3$ | $-CH_3$ | $-CH_2-CH_2-$ | 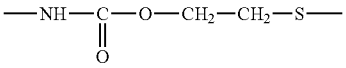 | Formula (2A) | $-CH_3$ | 60 |
| u2-32 | $-CH_3$ | $-H$ | $-CH_2-CH_2-$ | 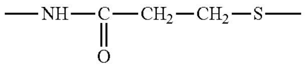 | Formula (2A) | $-CH_3$ | 60 |
| u2-33 | $-H$ | $-H$ | $-CH_2-CH_2-$ | 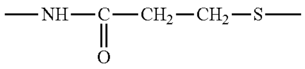 | Formula (2A) | $-CH_3$ | 60 |
| u2-34 | $-CH_3$ | $-H$ | $-CH_2-CH_2-$ | 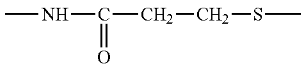 | Formula (2A) | $-CH_3$ | 60 |

TABLE 2-continued

| | Structural unit represented by formula (2) | | | | | | |
|---|---|---|---|---|---|---|---|
| No. | $R^{21}$ | $R^{22}$ | $Y^{A1}$ | $Y^B$ | $Z^A$ | $Z^{A1}$ | $m$ |
| u2-35 | $-CH_3$ | $-H$ | $-CH_2-CH_2-$ | 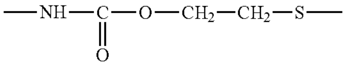 | Formula (2A) | $-CH_3$ | 60 |
| u2-36 | $-H$ | $-H$ | $-CH_2-CH_2-$ | 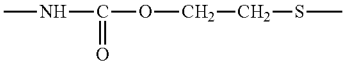 | Formula (2A) | $-CH_3$ | 60 |
| u2-37 | $-CH_3$ | $-H$ | $-CH_2-CH_2-$ | 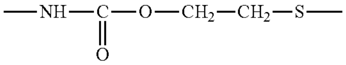 | Formula (2A) | $-CH_3$ | 60 |

<Electrophotographic Photosensitive Member>

An example of the layer configuration of the electrophotographic photosensitive member of the present disclosure is illustrated in FIG. 1. In FIG. 1, an undercoat layer 102, a charge-generating layer 103, a charge-transporting layer 104, and a surface layer 105 are laminated on a support 101. A photosensitive layer may include a laminate type photosensitive layer including the charge-generating layer and the charge-transporting layer, or may include a monolayer type photosensitive layer containing a charge-generating substance and a charge-transporting substance.

The surface layer of the electrophotographic photosensitive member of the present disclosure contains the fluorine atom-containing resin particles and the polymer A having the structural unit represented by the formula (1).

As a method of producing the electrophotographic photosensitive member of the present disclosure, there is given a method involving preparing coating liquids for respective layers to be described later, sequentially applying coating liquids for desired layers, and drying the coating liquids. In this case, as a method of applying the coating liquids, there are given, for example, dip coating, spray coating, inkjet coating, roll coating, die coating, blade coating, curtain coating, wire bar coating, and ring coating. Of those, dip coating is preferred from the viewpoints of efficiency and productivity.

The configuration of the electrophotographic photosensitive member of the present disclosure is described below.

<Support>

The support of the electrophotographic photosensitive member is preferably a support having electroconductivity (electroconductive support). In addition, examples of the shape of the support include a cylindrical shape, a belt shape, and a sheet shape. Of those, a cylindrical support is preferred. In addition, the surface of the support may be subjected to, for example, electrochemical treatment such as anodization, blast treatment, or cutting treatment.

A metal, a resin, glass, or the like is preferred as a material for the support.

Examples of the metal include aluminum, iron, nickel, copper, gold, stainless steel, and alloys thereof. Of those, an aluminum support using aluminum is preferred.

In addition, electroconductivity is preferably imparted to the resin or the glass through treatment involving, for example, mixing or coating the resin or the glass with an electroconductive material.

<Electroconductive Layer>

An electroconductive layer may be arranged on the support. The arrangement of the electroconductive layer can conceal flaws and unevenness in the surface of the support, and control the reflection of light on the surface of the support.

The electroconductive layer preferably contains electroconductive particles and a resin.

A material for the electroconductive particles is, for example, a metal oxide, a metal, or carbon black.

Examples of the metal oxide include zinc oxide, aluminum oxide, indium oxide, silicon oxide, zirconium oxide, tin oxide, titanium oxide, strontium titanate, magnesium oxide, antimony oxide, and bismuth oxide. Examples of the metal include aluminum, nickel, iron, nichrome, copper, zinc, and silver.

Of those, metal oxide particles are preferably used as the electroconductive particles, and in particular, titanium oxide particles, tin oxide particles, and zinc oxide particles are more preferably used.

When the metal oxide particles are used as the electroconductive particles, the surface of each of the metal oxide particles may be treated with a silane coupling agent or the like, or the metal oxide particles may each be doped with an element, such as phosphorus or aluminum, or an oxide thereof.

In addition, the electroconductive particles may each be of a laminated construction having a core particle and a coating layer coating the particle. Examples of the core particle include titanium oxide particles, barium sulfate particles, and zinc oxide particles. The coating layer is, for example, metal oxide particles such as tin oxide.

In addition, when the metal oxide particles are used as the electroconductive particles, their volume-average particle diameter is preferably from 1 nm to 500 nm, more preferably from 3 nm to 400 nm.

Examples of the resin include a polyester resin, a polycarbonate resin, a polyvinyl acetal resin, an acrylic resin, a silicone resin, an epoxy resin, a melamine resin, a polyurethane resin, a phenol resin, and an alkyd resin.

In addition, the electroconductive layer may further contain a concealing agent, such as a silicone oil, resin particles, or titanium oxide.

The electroconductive layer may be formed by preparing a coating liquid for an electroconductive layer containing the above-mentioned materials and a solvent, forming a coating film thereof on the support, and drying the coating film. Examples of the solvent to be used for the coating liquid for an electroconductive layer include an alcohol-based solvent, a sulfoxide-based solvent, a ketone-based solvent, an ether-based solvent, an ester-based solvent, and an aromatic hydrocarbon-based solvent. A dispersion method for dispersing the electroconductive particles in the coating liquid for an electroconductive layer is, for example, a method involving using a paint shaker, a sand mill, a ball mill, or a liquid collision type high-speed disperser.

The thickness of the electroconductive layer is preferably from 1 m to 50 m, particularly preferably from 3 m to 40 m.

<Undercoat Layer>

In the present disclosure, the undercoat layer may be arranged on the support or the electroconductive layer. The arrangement of the undercoat layer can improve an adhesive function between layers to impart a charge injection-inhibiting function.

The undercoat layer preferably contains a resin. In addition, the undercoat layer may be formed as a cured film by polymerizing a composition containing a monomer having a polymerizable functional group.

Examples of the resin include a polyester resin, a polycarbonate resin, a polyvinyl acetal resin, an acrylic resin, an epoxy resin, a melamine resin, a polyurethane resin, a phenol resin, a polyvinyl phenol resin, an alkyd resin, a polyvinyl alcohol resin, a polyethylene oxide resin, a polypropylene oxide resin, a polyamide resin, a polyamic acid resin, a polyimide resin, a polyamide imide resin, and a cellulose resin.

Examples of the polymerizable functional group of the monomer having a polymerizable functional group include an isocyanate group, a blocked isocyanate group, a methylol group, an alkylated methylol group, an epoxy group, a metal alkoxide group, a hydroxy group, an amino group, a carboxy group, a thiol group, a carboxylic acid anhydride group, and a carbon-carbon double bond group.

In addition, the undercoat layer may further contain an electron-transporting substance, metal oxide particles, metal particles, an electroconductive polymer, and the like for the purpose of improving electric characteristics. Of those, an electron-transporting substance and metal oxide particles are preferably used.

Examples of the electron-transporting substance include a quinone compound, an imide compound, a benzimidazole compound, a cyclopentadienylidene compound, a fluorenone compound, a xanthone compound, a benzophenone compound, a cyanovinyl compound, a halogenated aryl compound, a silole compound, and a boron-containing compound. An electron-transporting substance having a polymerizable functional group may be used as the electron-transporting substance and copolymerized with the above-mentioned monomer having a polymerizable functional group to form the undercoat layer as a cured film.

Examples of the metal oxide particles include particles of indium tin oxide, tin oxide, indium oxide, titanium oxide, strontium titanate, zinc oxide, and aluminum oxide. Particles of silicon dioxide may also be used. Examples of the metal particles include particles of gold, silver, and aluminum.

The metal oxide particles to be incorporated into the undercoat layer may be subjected to surface treatment with a surface treatment agent such as a silane coupling agent before use.

A general method is used as a method of subjecting the metal oxide particles to the surface treatment. Examples thereof include a dry method and a wet method.

The dry method involves, while stirring the metal oxide particles in a mixer capable of high-speed stirring such as a Henschel mixer, adding an alcoholic aqueous solution, organic solvent solution, or aqueous solution containing the surface treatment agent, uniformly dispersing the mixture, and then drying the dispersion.

In addition, the wet method involves stirring the metal oxide particles and the surface treatment agent in a solvent, or dispersing the metal oxide particles and the surface treatment agent in a solvent with a sand mill or the like using glass beads or the like. After the dispersion, the solvent is removed by filtration or evaporation under reduced pressure. After the removal of the solvent, it is preferred to further perform baking at 100° C. or more.

The undercoat layer may further contain an additive, and for example, may contain a known material, such as: metal particles such as aluminum particles; electroconductive substance particles such as carbon black; a charge-transporting substance; a metal chelate compound; or an organometallic compound.

The undercoat layer may be formed by preparing a coating liquid for an undercoat layer containing the above-mentioned materials and a solvent, forming a coating film thereof on the support or the electroconductive layer, and drying and/or curing the coating film.

Examples of the solvent to be used for the coating liquid for an undercoat layer include organic solvents, such as an alcohol, a sulfoxide, a ketone, an ether, an ester, an aliphatic halogenated hydrocarbon, and an aromatic compound. In the present disclosure, alcohol-based and ketone-based solvents are preferably used.

A dispersion method for preparing the coating liquid for an undercoat layer is, for example, a method involving using a homogenizer, an ultrasonic disperser, a ball mill, a sand mill, a roll mill, a vibration mill, an attritor, or a liquid collision type high-speed disperser.

The thickness of the undercoat layer is preferably 0.1 m or more, more preferably 0.2 m or more, particularly preferably 0.3 m or more. In addition, the thickness of the undercoat layer is preferably 50 m or less, more preferably 40 m or less, still more preferably 30 m or less, still more preferably 10 m or less, particularly preferably 5 m or less.

<Photosensitive Layer>

The photosensitive layers of the electrophotographic photosensitive member are mainly classified into (1) a laminate type photosensitive layer and (2) a monolayer type photosensitive layer. (1) The laminate type photosensitive layer is a photosensitive layer having a charge-generating layer containing a charge-generating substance and a charge-transporting layer containing a charge-transporting substance. (2) The monolayer type photosensitive layer is a photosensitive layer containing both a charge-generating substance and a charge-transporting substance.

(1) Laminate Type Photosensitive Layer

The laminate type photosensitive layer has the charge-generating layer and the charge-transporting layer.

(1-1) Charge-Generating Layer

The charge-generating layer preferably contains the charge-generating substance and a resin.

Examples of the charge-generating substance include azo pigments, perylene pigments, polycyclic quinone pigments, indigo pigments, and phthalocyanine pigments. Of those, azo pigments and phthalocyanine pigments are preferred. Of the phthalocyanine pigments, an oxytitanium phthalocyanine pigment, a chlorogallium phthalocyanine pigment, and a hydroxygallium phthalocyanine pigment are preferred.

The content of the charge-generating substance in the charge-generating layer is preferably from 40 mass % to 85 mass %, more preferably from 60 mass % to 80 mass % with respect to the total mass of the charge-generating layer.

Examples of the resin include a polyester resin, a polycarbonate resin, a polyvinyl acetal resin, a polyvinyl butyral resin, an acrylic resin, a silicone resin, an epoxy resin, a melamine resin, a polyurethane resin, a phenol resin, a polyvinyl alcohol resin, a cellulose resin, a polystyrene resin, a polyvinyl acetate resin, and a polyvinyl chloride resin. Of those, a polyvinyl butyral resin is more preferred.

In addition, the charge-generating layer may further contain an additive, such as an antioxidant or a UV absorber. Specific examples thereof include a hindered phenol compound, a hindered amine compound, a sulfur compound, a phosphorus compound, and a benzophenone compound.

The charge-generating layer may be formed by preparing a coating liquid for a charge-generating layer containing the above-mentioned materials and a solvent, forming a coating film thereof on the undercoat layer, and drying the coating film. Examples of the solvent to be used for the coating liquid include an alcohol-based solvent, a sulfoxide-based solvent, a ketone-based solvent, an ether-based solvent, an ester-based solvent, and an aromatic hydrocarbon-based solvent.

The thickness of the charge-generating layer is preferably from 0.1 m to 1 m, more preferably from 0.15 m to 0.4 m.

(1-2) Charge-Transporting Layer

The charge-transporting layer preferably contains the charge-transporting substance and a binder material.

In the case where a protective layer to be described later is not arranged, the charge-transporting layer serves as the surface layer of the electrophotographic photosensitive member. In this case, the charge-transporting layer contains the fluorine atom-containing resin particles, the binder material, and the polymer A having the structural unit represented by the formula (1).

Examples of the charge-transporting substance include a polycyclic aromatic compound, a heterocyclic compound, a hydrazone compound, a styryl compound, an enamine compound, a triarylamine compound, and a resin having a group derived from each of those substances. Of those, a triarylamine compound is preferred.

The content of the charge-transporting substance in the charge-transporting layer is preferably from 25 mass % to 70 mass %, more preferably from 30 mass % to 55 mass % with respect to the total mass of the charge-transporting layer.

A thermoplastic resin (hereinafter also referred to as "resin") is used as the binder material.

Examples of the thermoplastic resin include a polyester resin, a polycarbonate resin, an acrylic resin, and a polystyrene resin. Of those, a polycarbonate resin and a polyester resin are preferred. A polyarylate resin is particularly preferred as the polyester resin.

A content ratio (mass ratio) between the charge-transporting substance and the resin is preferably from 4:10 to 20:10, more preferably from 5:10 to 12:10.

The content of the fluorine atom-containing resin particles in the charge-transporting layer is preferably from 5 mass % to 15 mass %. Further, the content of the fluorine atom-containing resin particles in the charge-transporting layer is more preferably from 7 mass % to 10 mass %.

In addition, the charge-transporting layer may contain an additive, such as an antioxidant, a UV absorber, a plasticizer, or a leveling agent. Specific examples thereof include a hindered phenol compound, a hindered amine compound, a sulfur compound, a phosphorus compound, a benzophenone compound, a siloxane-modified resin, a silicone oil, polystyrene resin particles, polyethylene resin particles, and boron nitride particles.

The charge-transporting layer may be formed by preparing a coating liquid for a charge-transporting layer containing the above-mentioned materials and a solvent, forming a coating film thereof on the charge-generating layer, and drying the coating film. Examples of the solvent to be used for the coating liquid include an alcohol-based solvent, a ketone-based solvent, an ether-based solvent, an ester-based solvent, and an aromatic hydrocarbon-based solvent. Of those solvents, an ether-based solvent or an aromatic hydrocarbon-based solvent is preferred.

The thickness of the charge-transporting layer is preferably from 5 m to 50 m, more preferably from 8 m to 40 m, particularly preferably from 10 m to 30 m.

(2) Monolayer Type Photosensitive Layer

The monolayer type photosensitive layer may be formed by preparing a coating liquid for a photosensitive layer containing the charge-generating substance, the charge-transporting substance, a resin, and a solvent, forming a coating film thereof on the undercoat layer, and drying the coating film. Examples of the charge-generating substance, the charge-transporting substance, and the resin are the same as those of the materials in the section "(1) Laminate Type Photosensitive Layer."

<Protective Layer>

In the present disclosure, a protective layer may be arranged on the photosensitive layer. The arrangement of the protective layer can improve durability.

In the case where the protective layer is arranged, the protective layer serves as the surface layer of the electrophotographic photosensitive member. In this case, the protective layer contains the fluorine atom-containing resin particles, the binder material, and the polymer A having the structural unit represented by the formula (1).

The protective layer may be formed as a cured film by polymerizing, for example, a composition containing a monomer having a polymerizable functional group, the composition serving as a raw material for the binder material. A reaction at that time is, for example, a thermal polymerization reaction, a photopolymerization reaction, or a radiation polymerization reaction. Examples of the polymerizable functional group of the monomer having a polymerizable functional group include an isocyanate group, a blocked isocyanate group, a methylol group, an alkyl methylol group, an epoxy group, a metal alkoxyl group, a hydroxy group, an amino group, a carboxy group, a thiol group, a carboxylic acid anhydride group, and a group containing a carbon-carbon double bond. Examples of the group containing a carbon-carbon double bond include an acryloyl group and a methacryloyl group. A monomer having a charge-transporting ability may be used as the monomer having a polymerizable functional group.

Herein, the cured product of the monomer having a polymerizable functional group is the binder material of the protective layer.

A hole-transportable compound having a chain-polymerizable functional group is preferably used as the monomer having a polymerizable functional group.

The hole-transportable compound having a chain-polymerizable functional group is preferably a compound represented by the following formula (CT-1) or (CT-2):

(CT-1)

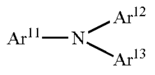

where, in the formula (CT-1), $Ar^{11}$ to $Ar^{13}$ each independently represent a substituted aryl group or an unsubstituted aryl group, and a substituent that the substituted aryl group may have is an alkyl group having 1 to 6 carbon atoms, or a monovalent functional group represented by any one of the following formulae (P-1) to (P-3), provided that the compound represented by the formula (CT-1) has at least one monovalent functional group represented by any one of the following formulae (P-1) to (P-3);

(CT-2)

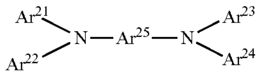

where, in the formula (CT-2), $Ar^{21}$ to $Ar^{24}$ each independently represent a substituted aryl group or an unsubstituted aryl group, $Ar^{25}$ represents a substituted arylene group or an unsubstituted arylene group, a substituent that the substituted aryl group may have is an alkyl group having 1 to 6 carbon atoms, or a monovalent functional group represented by any one of the following formulae (P-1) to (P-3), and a substituent that the substituted arylene group may have is an alkyl group having 1 to 6 carbon atoms, or a monovalent functional group represented by any one of the following formulae (P-1) to (P-3), provided that the compound represented by the formula (CT-2) has at least one monovalent functional group represented by any one of the following formulae (P-1) to (P-3);

(P-1)

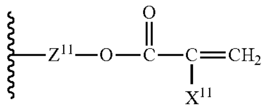

where, in the formula (P-1), $Z^{11}$ represents a single bond or an alkylene group having 1 to 6 carbon atoms, and $X^{11}$ represents a hydrogen atom or a methyl group;

(P-2)

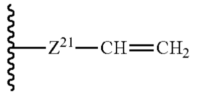

where, in the formula (P-2), $Z^{21}$ represents a single bond or an alkylene group having 1 to 6 carbon atoms;

(P-3)

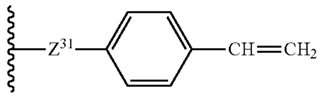

where, in the formula (P-3), $Z^{31}$ represents a single bond or an alkylene group having 1 to 6 carbon atoms.

The content of the fluorine atom-containing resin particles in the protective layer is preferably from 20 mass % to 40 mass %. Further, the content of the fluorine atom-containing resin particles in the protective layer is more preferably from 25 mass % to 35 mass %.

The protective layer preferably contains a compound represented by the following formula (3). In addition, at the time of the production of a coating liquid for a surface layer, the compound represented by the following formula (3) is preferably a liquid compound from the viewpoint that the compound is used as a dispersion medium.

$$R^{31}\text{—O—}R^{32} \quad (3)$$

In the formula (3), $R^{31}$ represents an alkyl group or a fluoroalkyl group, and $R^{32}$ represents a fluoroalkyl group. $R^{31}$ preferably represents a fluoroalkyl group.

Examples of the compound represented by the formula (3) include methyl nonafluorobutyl ether, ethyl nonafluorobutyl ether, 1,1,1,2,3,4,4,5,5,5-decafluoro-3-methoxy-2-(trifluoromethyl)pentane, and 1,1,2,2-tetrafluoroethyl-2,2,2-trifluoroethyl ether. Of those, 1,1,2,2-tetrafluoroethyl-2,2,2-trifluoroethyl ether is preferred from the viewpoints of an improvement in dispersibility of the particles and the suppression of a potential fluctuation.

The content of the compound represented by the formula (3) in the protective layer is preferably from 1 ppm to 10 ppm from the viewpoint of the suppression of a potential fluctuation. Further, the compound represented by the formula (3) is more preferably 1,1,2,2-tetrafluoroethyl-2,2,2-trifluoroethyl ether.

A method of measuring the content of the compound represented by the formula (3) in the protective layer is, for example, a method based on GCMS analysis. A product shaved from the surface layer on the electrophotographic photosensitive member with a razor or the like is used as a measurement sample, and its mass is defined as a film mass. The content of the compound represented by the formula (3) incorporated into the surface layer may be measured by analyzing the measurement sample with a GCMS. For example, GCMS-QP2000 (manufactured by Shimadzu Corporation) may be utilized as an apparatus to be used in the GCMS analysis. Also in each of Examples of the present disclosure, a measurement sample was obtained by the above-mentioned method, and then the content of the compound represented by the formula (3) was measured with the above-mentioned GCMS apparatus.

The protective layer may contain an additive, such as an antioxidant, a UV absorber, a plasticizer, or a leveling agent. Specific examples thereof include a hindered phenol compound, a hindered amine compound, a sulfur compound, a phosphorus compound, a benzophenone compound, a siloxane-modified resin, and a silicone oil.

The protective layer may be formed by preparing a coating liquid for a protective layer containing the above-mentioned materials and a solvent, forming a coating film thereof on the photosensitive layer, and drying and/or curing the coating film. Examples of the solvent to be used for the coating liquid include an alcohol-based solvent, a ketone-based solvent, an ether-based solvent, a sulfoxide-based solvent, an ester-based solvent, and an aromatic hydrocarbon-based solvent.

The thickness of the protective layer is preferably from 0.5 m to 10 m, more preferably from 1 m to 7 m.

<Surface Processing of Electrophotographic Photosensitive Member>

In the present disclosure, the surface processing of the electrophotographic photosensitive member may be performed. The performance of the surface processing can further stabilize the behavior of a cleaning unit (cleaning blade) to be brought into contact with the electrophotographic photosensitive member. A method for the surface processing is, for example, a method including bringing a mold having a convex portion into pressure contact with the surface of the electrophotographic photosensitive member to perform shape transfer, a method including imparting an uneven shape to the surface through mechanical polishing, or a method including causing powder to collide with the surface of the electrophotographic photosensitive member to roughen the surface. When a concave portion or a convex portion is arranged on the surface layer of the electrophotographic photosensitive member as described above, the behavior of the cleaning unit to be brought into contact with the electrophotographic photosensitive member can be further stabilized.

The above-mentioned concave portion or convex portion may be formed in the entire region of the surface of the electrophotographic photosensitive member, or may be formed on part of the surface of the electrophotographic photosensitive member. When the concave portion or the convex portion is formed on part of the surface of the electrophotographic photosensitive member, the concave portion or the convex portion is preferably formed in at least the entirety of the region of the photosensitive member to be brought into contact with the cleaning unit (cleaning blade).

When the concave portion is formed, the concave portion may be formed in the surface of the electrophotographic photosensitive member by bringing a mold having a convex portion corresponding to the concave portion into pressure contact with the surface of the electrophotographic photosensitive member to perform shape transfer.

<Polishing Tool to be Used in Mechanical Polishing>

A known unit may be utilized in the mechanical polishing. In general, a polishing tool is brought into abutment with the electrophotographic photosensitive member, and one, or each of both, of the polishing tool and the electrophotographic photosensitive member is relatively moved to polish the surface of the electrophotographic photosensitive member. The polishing tool is a polishing member obtained by arranging, on a substrate, a layer obtained by dispersing polishing abrasive grains in a binder resin.

Examples of the abrasive grains include particles of aluminum oxide, chromium oxide, diamond, iron oxide, cerium oxide, corundum, silica, silicon nitride, boron nitride, molybdenum carbide, silicon carbide, tungsten carbide, titanium carbide, and silicon oxide. The particle diameter of each of the abrasive grains is preferably from 0.01 m to 50 m, and is more preferably from 1 m to 15 m. When the particle diameter of each of the abrasive grains is excessively small, their polishing power weakens to make it difficult to increase the F/C ratio of the outermost surface of the electrophotographic photosensitive member. Those abrasive grains may be used alone or as a mixture thereof. When two or more kinds of the abrasive grains are mixed, their materials or particle diameters may be different from or identical to each other.

A thermoplastic resin, a thermosetting resin, a reactive resin, an electron beam-curable resin, a UV-curable resin, a visible light-curable resin, and an antifungal resin that are known may each be used as the binder resin in which the abrasive grains to be used in the polishing tool are dispersed. Examples of the thermoplastic resin include a vinyl chloride resin, a polyamide resin, a polyester resin, a polycarbonate resin, an amino resin, a styrene-butadiene copolymer, a urethane elastomer, and a polyamide-silicone resin. Examples of the thermosetting resin include a phenol resin, a phenoxy resin, an epoxy resin, a polyurethane resin, a polyester resin, a silicone resin, a melamine resin, and an alkyd resin. In addition, an isocyanate-based curing agent may be added to the thermoplastic resin.

The thickness of the layer of the polishing tool, which is obtained by dispersing the abrasive grains in the binder resin, is preferably from 1 m to 100 m. When the thickness is excessively large, thickness unevenness is liable to occur, and as a result, the unevenness of the surface roughness of a polishing target becomes a problem. Meanwhile, when the thickness is excessively small, the falling of the abrasive grains is liable to occur.

The shape of the substrate of the polishing tool is not particularly limited. Although a sheet-shaped substrate was used in each of Examples of the present disclosure for efficiently polishing a cylindrical electrophotographic photosensitive member, any other shape is permitted (the polishing tool of the present disclosure is hereinafter also described as "polishing sheet"). A material for the substrate of the polishing tool is also not particularly limited. A material for the sheet-shaped substrate is, for example, paper, a woven fabric, a nonwoven fabric, or a plastic film.

The polishing tool may be obtained by: mixing the abrasive grains and the binder resin described above, and a solvent capable of dissolving the binder resin to disperse the materials in the solvent; applying the resultant paint onto the substrate; and drying the paint.

<Polishing Apparatus>

Figure 2:
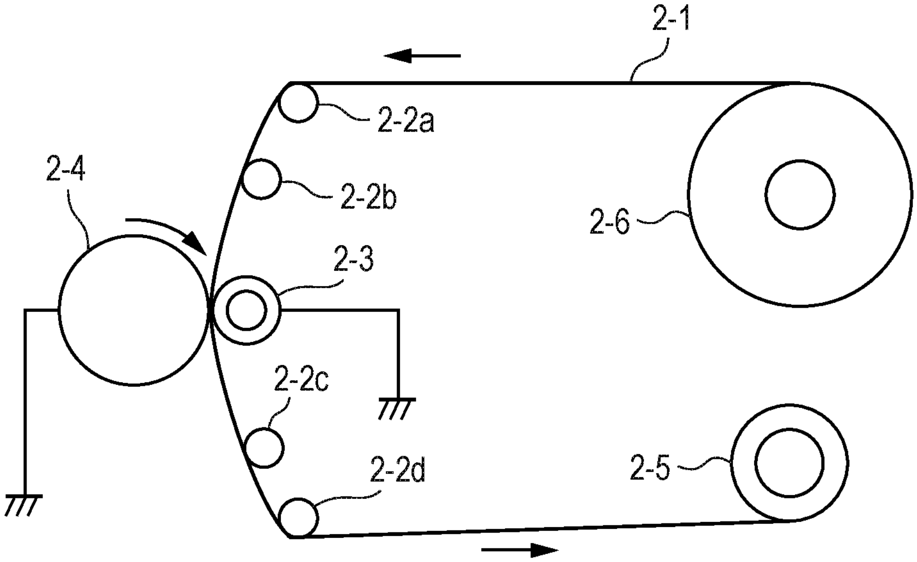
FIG. 2 is a view for illustrating an example of a polishing machine using a polishing sheet.

An example of a polishing apparatus for the electrophotographic photosensitive member of the present disclosure is illustrated in FIG. 2.

FIG. 2 is an illustration of an apparatus for polishing a cylindrical electrophotographic photosensitive member with a polishing sheet. In FIG. 2, a polishing sheet 2-1 is wound around a hollow shaft 2-6, and a motor (not shown) is arranged so that a tension may be applied to the polishing sheet 2-1 in a direction opposite to the direction in which the polishing sheet 2-1 is fed to the shaft 2-6. The polishing sheet 2-1 is fed in a direction indicated by the arrow, and passes through a backup roller 2-3 via guide rollers 2-2*a* and 2-2*b*. The polishing sheet 2-1 after the polishing is taken up around a take-up unit 2-5 by the motor (not shown) via guide rollers 2-2*c* and 2-2*d*. The polishing is performed by bringing the polishing sheet 2-1 into pressure contact with a treatment target (electrophotographic photosensitive member before the performance of the polishing) 2-4 all the time. The polishing sheet 2-1 is often insulating, and hence a product connected to the ground or a product having electroconductivity is preferably used in a site with which the polishing sheet 2-1 is brought into contact.

The feeding speed of the polishing sheet 2-1 preferably falls within the range of from 10 mm/min to 1,000 mm/min. When the feeding amount thereof is small, the binder resin adheres to the surface of the polishing sheet 2-1, and a deep flaw resulting from the adhesion occurs in the surface of the treatment target 2-4 in some cases.

The treatment target 2-4 is placed at a position facing the backup roller 2-3 through the polishing sheet 2-1. The backup roller 2-3 is preferably an elastic body from the viewpoint of improving the uniformity of the surface roughness of the treatment target 2-4. At this time, the treatment target 2-4 and the backup roller 2-3 are pressed against each other through the polishing sheet 2-1 at a pressure of a desired preset value for a predetermined time period. Thus, the surface of the treatment target 2-4 is polished. The rotation direction of the treatment target 2-4 may be identical to the direction in which the polishing sheet 2-1 is fed, or may be opposite thereto. In addition, the rotation direction may be changed in the middle of the polishing.

The pressure at which the backup roller 2-3 is pressed against the treatment target 2-4 is preferably from 0.005 $N/m^2$ to 15 $N/m^2$, though the preferred value varies depending on the hardness of the backup roller 2-3 and a polishing time.

The surface roughness of the electrophotographic photosensitive member may be adjusted by appropriately selecting, for example, the feeding speed of the polishing sheet 2-1, the pressure at which the backup roller 2-3 is pressed against the treatment target, the kinds of the abrasive grains of the polishing sheet, the thickness of the binder resin of the polishing sheet, and the thickness of the substrate.

<Measurement of Maximum Height Rmax in JIS B 0601 1982>

The surface roughness of the electrophotographic photosensitive member may be measured with a known unit. Examples thereof include the following: a surface roughness meter such as a surface roughness measuring instrument SURFCORDER SE3500 manufactured by Kosaka Laboratory Ltd.; a non-contact three-dimensional surface-measuring machine MICROMAP 557N manufactured by Ryoka Systems Inc.; and a microscope capable of obtaining a three-dimensional shape, such as an ultra-depth shape-measuring microscope VK-8550 or VK-9000 manufactured by Keyence Corporation.

In the present disclosure, out of the indices of a surface roughness, a maximum height Rmax in JIS B 0601 1982 specified by Japanese Industrial Standards (JIS) is used as a polishing depth L (m). In addition, in the present disclosure, the Rmax is measured in advance for a 5-millimeter square section range of the electrophotographic photosensitive member to be cut out as a specimen for X-ray photoelectron spectroscopy to be described later. The measurement is performed at 3 arbitrary sites in the 5-millimeter square range, and the average of the measured values is adopted as the polishing depth L (m).

<Process Cartridge and Electrophotographic Apparatus>

The electrophotographic photosensitive member of the present disclosure may be one constituent for a process cartridge or an electrophotographic apparatus. The process cartridge is characterized by integrally supporting the electrophotographic photosensitive member described in the foregoing, and at least one unit selected from the group consisting of: a charging unit; a developing unit; a transferring unit; and a cleaning unit, and being detachably attachable to the main body of an electrophotographic apparatus. In addition, the electrophotographic apparatus is characterized by including: the electrophotographic photosensitive member described in the foregoing; a charging unit; an exposing unit; a developing unit; and a transferring unit.

Figure 3:
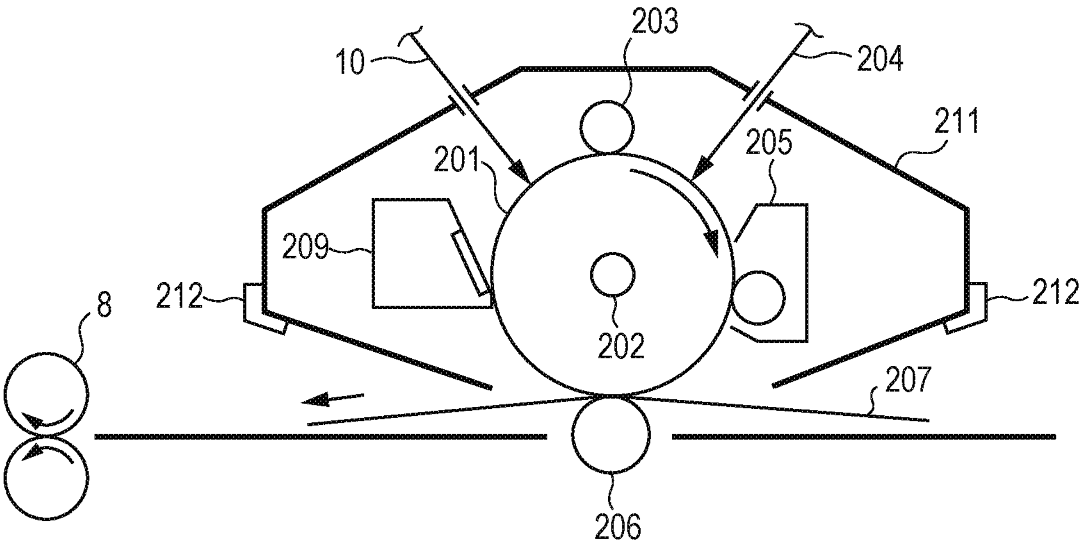
FIG. 3 is a view for illustrating an example of the schematic configuration of each of a process cartridge including an electrophotographic photosensitive member and an electrophotographic apparatus including the process cartridge.

An example of the schematic configuration of an electrophotographic apparatus including a process cartridge including an electrophotographic photosensitive member is illustrated in FIG. 3.

An electrophotographic photosensitive member 201 of a cylindrical shape (drum shape) is rotationally driven about a shaft 202 in a direction indicated by the arrow at a predetermined peripheral speed (process speed). The surface of the electrophotographic photosensitive member 201 is charged to a predetermined positive or negative potential by a charging unit 203 in the rotational process. In FIG. 3, a roller charging system based on a roller type charging member is illustrated, but a charging system, such as a corona charging system, a proximity charging system, or an injection charging system, may be adopted. The charged surface of the electrophotographic photosensitive member 201 is irradiated with exposure light 204 from an exposing unit (not shown), and hence an electrostatic latent image corresponding to target image information is formed thereon. The exposure light 204 is light whose intensity has been modulated in correspondence with a time-series electric digital image signal of information on a target image, and is emitted, for example, from an image exposing unit, such as slit exposure or laser beam scanning exposure. The electrostatic latent image formed on the surface of the electrophotographic photosensitive member 201 is developed (normal development or reversal development) with toner stored in a developing unit 205 to form a toner image on the surface of the electrophotographic photosensitive member 201. The toner image formed on the surface of the electrophotographic photosensitive member 201 is transferred by a transferring unit 206 onto a transfer material 207. At this time, a bias voltage opposite in polarity to charge that the toner possesses is applied from a bias power source (not shown) to the transferring unit 206. In addition, when the transfer material 207 is paper, the transfer material 207 is taken out of a sheet feeding portion (not shown) and supplied to a space between the electrophotographic photosensitive member 201 and the transferring unit 206 in sync with the rotation of the electrophotographic photosensitive member 201. The transfer material 207 onto which the toner image has been transferred from the electrophotographic photosensitive member 201 is separated from the surface of the electrophotographic photosensitive member 201, is conveyed to a fixing unit 208, and is subjected to a treatment for fixing the toner image to be printed out as an image-formed product (a print or a copy) to the outside of the electrophotographic apparatus. The electrophotographic apparatus may include a cleaning unit 209 for removing a deposit such as the toner remaining on the surface of the electrophotographic photosensitive member 201 after the transfer. In addition, a so-called cleaner-less system configured to remove the deposit with the developing unit or the like without separate arrangement of a cleaning unit may be used. A plurality of constituents selected from the electrophotographic photosensitive member 201, the charging unit 203, the developing unit 205, the cleaning unit 209, and the like may be stored in a container and integrally supported to form a process cartridge. In addition, the process cartridge may be detachably attachable to the main body of the electrophotographic apparatus. For example, such a configuration as described below may be adopted. At least one selected from the charging unit 203, the developing unit 205, and the cleaning unit 209 is integrally supported with the electrophotographic photosensitive member 201 to form a cartridge. The cartridge may be used as a process cartridge 211 detachably attachable to the main body of the electrophotographic apparatus with a guiding unit 212 such as a rail of the main body of the electrophotographic apparatus. The electrophotographic apparatus may include an electricity-removing mechanism configured to subject the surface of the electrophotographic photosensitive member 201 to electricity-removing treatment with pre-exposure light 210 from a pre-exposing unit (not shown). In addition, the guiding unit 212 such as the rail may be arranged for detachably attaching the process cartridge 211 to the main body of the electrophotographic apparatus. The electrophotographic apparatus of the present disclosure is characterized by including the electrophotographic photosensitive member 201, the charging unit 203, the exposing unit, the developing unit 205, and the transferring unit 206.

Figure 4:
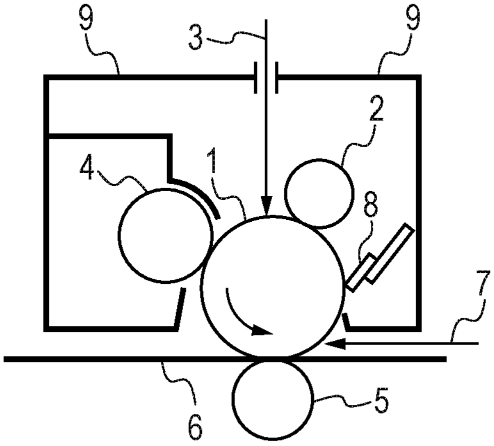
FIG. 4 is a schematic view for illustrating an example of a process cartridge including an electrophotographic photosensitive member.
Figure 5:
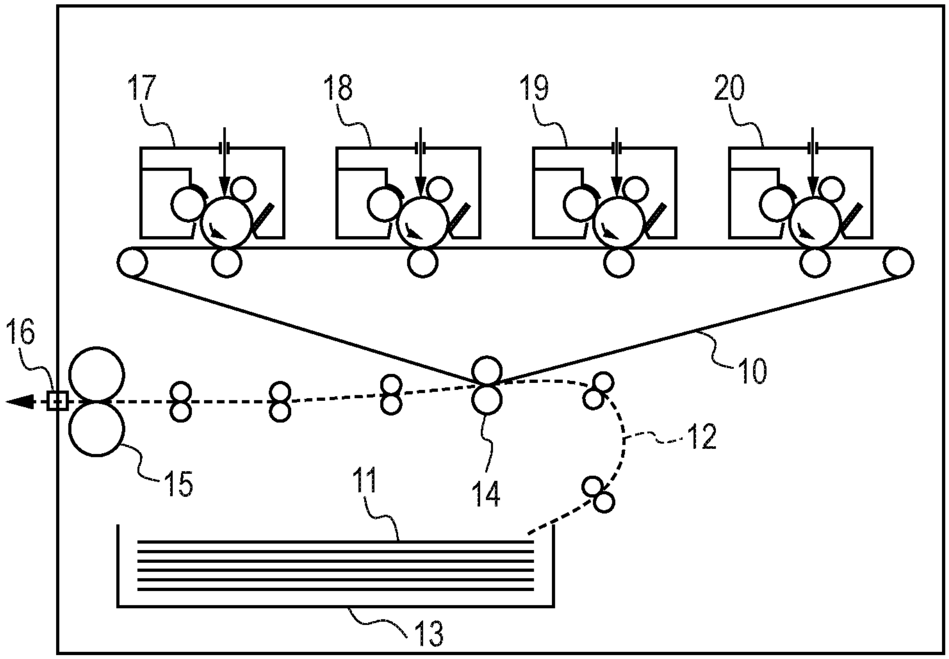
FIG. 5 is a schematic view for illustrating an example of an electrophotographic apparatus including an electrophotographic photosensitive member.

In addition, the configuration of a process cartridge including the electrophotographic photosensitive member of the present disclosure is illustrated in FIG. 4, and an example of the schematic configuration of an electrophotographic apparatus including the process cartridge of FIG. 4 is illustrated in FIG. 5.

In FIG. 4, an electrophotographic photosensitive member 1 of a cylindrical shape is rotationally driven in a direction indicated by the arrow at a predetermined peripheral speed. The peripheral surface of the electrophotographic photosensitive member 1 to be rotationally driven is uniformly charged to a positive or negative predetermined potential by a charging unit 2. Next, the charged peripheral surface of the electrophotographic photosensitive member 1 receives exposure light (image exposure light) 3 emitted from an exposing unit (not shown), such as slit exposure or laser beam scanning exposure. Thus, electrostatic latent images corresponding to a target image are sequentially formed on the peripheral surface of the electrophotographic photosensitive member 1. Any one of a voltage obtained by superimposing an AC component on a DC component and a voltage formed only of a DC component may be used as a voltage to be applied to the charging unit (e.g., a charging roller) 2.

The electrostatic latent images formed on the peripheral surface of the electrophotographic photosensitive member 1 are developed with toner in the developer of a developing unit 4 to turn into toner images. Next, the toner images formed and carried on the peripheral surface of the electrophotographic photosensitive member 1 are sequentially transferred onto a transfer material (e.g., paper or an intermediate transfer member) 6 by a transfer bias from a transfer unit (e.g., a transfer roller) 5. The transfer material 6 is fed in sync with the rotation of the electrophotographic photosensitive member 1.

The surface of the electrophotographic photosensitive member 1 after the transfer of the toner images is subjected to electricity-removing treatment by pre-exposure light 7 from a pre-exposing unit (not shown). After that, transfer residual toner is removed from the surface by a cleaning unit 8, and hence the surface is cleaned. Thus, the electrophotographic photosensitive member 1 is repeatedly used in image formation. The electricity-removing treatment by the pre-exposing unit may be performed before the cleaning process or may be performed thereafter, and the pre-exposing unit is not necessarily required.

The electrophotographic photosensitive member 1 may be mounted on an electrophotographic apparatus, such as a copying machine or a laser beam printer. In addition, a process cartridge 9, which is formed by storing a plurality of constituents out of the constituents, such as the electrophotographic photosensitive member 1, the charging unit 2, the developing unit 4, and the cleaning unit 8, in a container, and integrally supporting the stored constituents, may be detachably attachable to the main body of the electrophotographic apparatus. In FIG. 4, the electrophotographic photosensitive member 1, the charging unit 2, the developing unit 4, and the cleaning unit 8 are integrally supported to form the process cartridge 9 detachably attachable to the main body of the electrophotographic apparatus.

Next, the electrophotographic apparatus including the electrophotographic photosensitive member of the present disclosure is described.

An example of the configuration of the electrophotographic apparatus of the present disclosure is illustrated in FIG. 5. A process cartridge 17 for a yellow color, a process cartridge 18 for a magenta color, a process cartridge 19 for a cyan color, and a process cartridge 20 for a black color corresponding to a yellow color, a magenta color, a cyan color, and a black color, respectively are juxtaposed along an intermediate transfer member 10. It is not necessarily required to unify the diameters and constituent materials of the electrophotographic photosensitive members, developers, charging systems, and the other units among the respective colors.

Once an image-forming operation starts, the toner images of the respective colors are sequentially superimposed on the intermediate transfer member 10 in accordance with the above-mentioned image-forming process. In parallel with the foregoing, transfer paper 11 is fed from a sheet-feeding tray 13 by a sheet-feeding path 12, and is fed to a secondary transfer unit 14 at the same timing as that of the rotation operation of the intermediate transfer member. The toner images on the intermediate transfer member 10 are transferred onto the transfer paper 11 by a transfer bias from the secondary transfer unit 14. The toner images transferred onto the transfer paper 11 are conveyed along the sheet-feeding path 12, and are fixed onto the transfer paper by a fixing unit 15, followed by the discharge of the paper from a sheet-discharging portion 16.

The electrophotographic photosensitive member of the present disclosure may be used in, for example, a laser beam printer, an LED printer, a copying machine, a facsimile, and a multifunctional peripheral thereof.

According to one aspect of the present disclosure, there can be provided the electrophotographic photosensitive member, which is excellent in dispersibility of the fluorine atom-containing resin particles in its surface layer and is suppressed from causing a potential fluctuation at the time of its repeated use.

EXAMPLES

The present disclosure is described in more detail below by way of Examples and Comparative Examples, but is not limited thereto. In the description of Examples below, the term "part(s)" means "part(s) by mass" unless otherwise stated.

<Synthesis of Polymer a Having Structural Unit Represented by Formula (1)>

The polymer A having the structural unit represented by the formula (1) (hereinafter also represented as "graft copolymer") in the present disclosure was synthesized as described below. Acrylate compounds and a macromonomer compound used in the following synthesis examples may be produced with reference to, for example, Japanese Patent Application Laid-Open No. 2009-104145.

(Graft Copolymer 1)

50 Parts of 1H,1H-perfluoro(2,5-dimethyl-3,6-dioxanonanoyl) acrylate (manufactured by Sigma-Aldrich Co. LLC), 75 parts of a macromonomer represented by the following formula (A) (number-average molecular weight: 6,000), 0.437 part of 1,1'-azobis(1-acetoxy-1-phenylethane) (product name: OTAZO-15, manufactured by Otsuka Chemical Co., Ltd.), and 338 parts of n-butyl acetate were mixed in a glass-made flask including a stirring machine, a reflux condenser, a nitrogen gas-introducing tube, a thermostat, and a temperature gauge at 20° C. under a nitrogen atmosphere for 30 minutes. After that, the mixture was subjected to a reaction for 5 hours while being warmed so that the temperature of a reaction liquid became from 85° C. to 90° C. The reaction was stopped by ice cooling, and 1,500 parts of 2-propanol was added to the reaction liquid to provide a precipitate. The precipitate was washed with a mixed solvent containing n-butyl acetate and 2-propanol at 1:5, and was dried at a temperature of 80° C. under a decompressed state of 1,325 Pa or less for 3 hours to provide a graft copolymer 1.

(A)

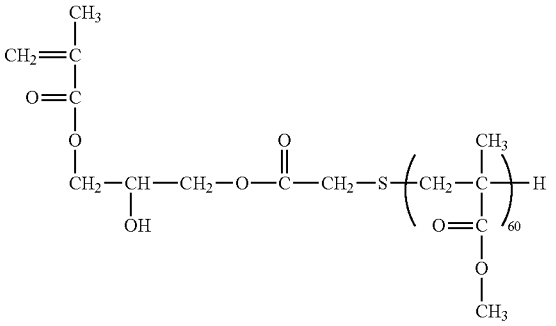

(Graft Copolymer 2)

A graft copolymer 2 was obtained in the same manner as in the graft copolymer 1 except that 1H,1H-perfluoro(2,5-dimethyl-3,6-dioxanonanoyl) acrylate was changed to 1H,1H-perfluoro(2,5-dimethyl-4,6-dioxanonanoyl) acrylate.

(Graft Copolymer 3)

A graft copolymer 3 was obtained in the same manner as in the graft copolymer 1 except that 1H,1H-perfluoro(2,5-dimethyl-3,6-dioxanonanoyl) acrylate was changed to 40 parts of 1H,1H-perfluoro(4,7-dioxanonanoyl) acrylate.

(Graft Copolymer 4)

A graft copolymer 4 was obtained in the same manner as in the graft copolymer 1 except that 1H,1H-perfluoro(2,5-dimethyl-3,6-dioxanonanoyl) acrylate was changed to 55 parts of 1H,1H-perfluoro(3,6-dimethyl-4,7-dioxadecanoyl) acrylate.

(Graft Copolymer 5)

A graft copolymer 5 was obtained in the same manner as in the graft copolymer 1 except that the amounts of 1H,1H-perfluoro(2,5-dimethyl-3,6-dioxanonanoyl) acrylate and the macromonomer represented by the formula (A) were changed to 2.5 parts and 570 parts, respectively.

(Graft Copolymer 6)

A graft copolymer 6 was obtained in the same manner as in the graft copolymer 1 except that the amounts of 1H,1H-perfluoro(2,5-dimethyl-3,6-dioxanonanoyl) acrylate and the macromonomer represented by the formula (A) were changed to 12.5 parts and 450 parts, respectively.

(Graft Copolymer 7)

A graft copolymer 7 was obtained in the same manner as in the graft copolymer 1 except that the amounts of 1H,1H-perfluoro(2,5-dimethyl-3,6-dioxanonanoyl) acrylate and the macromonomer represented by the formula (A) were changed to 25 parts and 300 parts, respectively.

(Graft Copolymer 8)

A graft copolymer 8 was obtained in the same manner as in the graft copolymer 1 except that the amounts of 1H,1H-perfluoro(2,5-dimethyl-3,6-dioxanonanoyl) acrylate and the macromonomer represented by the formula (A) were changed to 35 parts and 180 parts, respectively.

(Graft Copolymer 9)

A graft copolymer 9 was obtained in the same manner as in the graft copolymer 1 except that the amount of 1H,1H-perfluoro(2,5-dimethyl-3,6-dioxanonanoyl) acrylate was changed to 56.25 parts.

(Graft Copolymer 10)

A graft copolymer 10 was obtained in the same manner as in the graft copolymer 1 except that the amount of 1,1'-azobis(1-acetoxy-1-phenylethane) was changed to 0.819 part.

(Graft Copolymer 11)

A graft copolymer 11 was obtained in the same manner as in the graft copolymer 1 except that the amount of 1,1'-azobis(1-acetoxy-1-phenylethane) was changed to 0.728 part.

(Graft Copolymer 12)

A graft copolymer 12 was obtained in the same manner as in the graft copolymer 1 except that the amount of 1,1'-azobis(1-acetoxy-1-phenylethane) was changed to 0.164 part.

(Graft Copolymer 13)

A graft copolymer 13 was obtained in the same manner as in the graft copolymer 1 except that the amount of 1,1'-azobis(1-acetoxy-1-phenylethane) was changed to 0.131 part.

(Graft Copolymer 14)

A graft copolymer 14 was obtained in the same manner as in the graft copolymer 1 except that the amount of 1,1'-azobis(1-acetoxy-1-phenylethane) was changed to 0.874 part.

(Graft Copolymer 15)

A graft copolymer 15 was obtained in the same manner as in the graft copolymer 1 except that the amount of 1,1'-azobis(1-acetoxy-1-phenylethane) was changed to 0.119 part.

(Graft Copolymer 16)

A graft copolymer 16 was obtained in the same manner as in the graft copolymer 1 except that the amounts of 1H,1H-perfluoro(2,5-dimethyl-3,6-dioxanonanoyl) acrylate and the macromonomer represented by the formula (A) were changed to 20 parts and 360 parts, respectively.

(Graft Copolymer 17)

A graft copolymer 17 was obtained in the same manner as in the graft copolymer 1 except that the amounts of 1H,1H-perfluoro(2,5-dimethyl-3,6-dioxanonanoyl) acrylate and the macromonomer represented by the formula (A) were changed to 50 parts and 30 parts, respectively.

(Graft Copolymer 18)

A graft copolymer 18 was obtained in the same manner as in the graft copolymer 1 except that 1H,1H-perfluoro(2,5-dimethyl-3,6-dioxanonanoyl) acrylate was changed to 25 parts of 1H,1H-perfluoro(3,5-dioxahexanoyl) acrylate.

(Graft Copolymer 19)

A graft copolymer 19 was obtained in the same manner as in the graft copolymer 1 except that 1H,1H-perfluoro(2,5-dimethyl-3,6-dioxanonanoyl) acrylate was changed to 35 parts of 1H,1H-perfluoro(3,6-dioxaoctanoyl) acrylate.

(Graft Copolymer 20)

A graft copolymer 20 was obtained in the same manner as in the graft copolymer 1 except that 1H,1H-perfluoro(2,5-dimethyl-3,6-dioxanonanoyl) acrylate was changed to 1H,1H-perfluoro(4,7-dioxaundecanoyl) acrylate.

(Graft Copolymer 21)

A graft copolymer 21 was obtained in the same manner as in the graft copolymer 1 except that 1H,1H-perfluoro(2,5-dimethyl-3,6-dioxanonanoyl) acrylate was changed to 1H,1H,2H,2H-perfluoro(3,6-dimethyl-4,7-dioxadecanoyl) acrylate.

(Graft Copolymer 22)

A graft copolymer 22 was obtained in the same manner as in the graft copolymer 1 except that 1H,1H-perfluoro(2,5-dimethyl-3,6-dioxanonanoyl) acrylate was changed to 1H,1H,2H,2H-perfluoro(4,7-dioxaundecanoyl) acrylate.

The weight-average molecular weights of the resultant graft copolymers 1 to 22 were calculated by performing GPC measurement in accordance with the above-mentioned method. The results are shown in Table 3.

TABLE 3

| Graft copolymer No. | Structural unit represented by formula (1) | | | | | | Result of GPC measurement Weight-average molecular weight |
|---|---|---|---|---|---|---|---|
| | $R^{11}$ | $R^{12}$ | $Rf^1$ | $Rf^2$ | $Rf^3$ | Total number of carbon atoms of $Rf^1$ to $Rf^3$ | |
| 1 | —H | $—CH_2—$ | 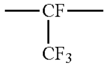 | 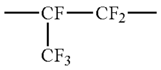 | $—CF_2—CF_2—CF_3$ | 8 | 31,879 |
| 2 | —H | $—CH_2—$ | 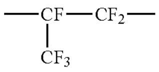 | 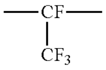 | $—CF_2—CF_2—CF_3$ | 8 | 31,330 |
| 3 | —H | $—CH_2—$ | $—CF_2—CF_2—$ | $—CF_2—CF_2—$ | $—CF_2—CF_3$ | 6 | 26,031 |
| 4 | —H | $—CH_2—$ | 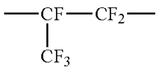 | 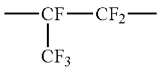 | $—CF_2—CF_2—CF_3$ | 9 | 34,052 |
| 5 | —H | $—CH_2—$ | 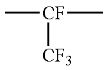 | 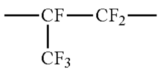 | $—CF_2—CF_2—CF_3$ | 8 | 33,685 |
| 6 | —H | $—CH_2—$ | 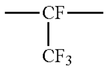 | 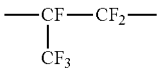 | $—CF_2—CF_2—CF_3$ | 8 | 32,460 |
| 7 | —H | $—CH_2—$ | 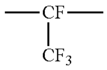 | 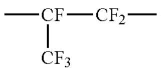 | $—CF_2—CF_2—CF_3$ | 8 | 28,454 |
| 8 | —H | $—CH_2—$ | 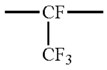 | 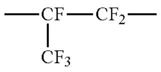 | $—CF_2—CF_2—CF_3$ | 8 | 30,413 |
| 9 | —H | $—CH_2—$ | 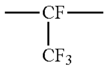 | 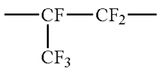 | $—CF_2—CF_2—CF_3$ | 8 | 32,501 |
| 10 | —H | $—CH_2—$ | 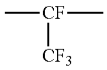 | 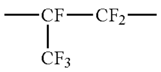 | $—CF_2—CF_2—CF_3$ | 8 | 16,902 |
| 11 | —H | $—CH_2—$ | 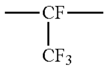 | 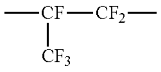 | $—CF_2—CF_2—CF_3$ | 8 | 19,127 |
| 12 | —H | $—CH_2—$ | 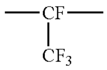 | 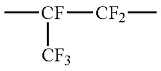 | $—CF_2—CF_2—CF_3$ | 8 | 84,010 |
| 13 | —H | $—CH_2—$ | 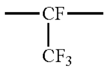 | 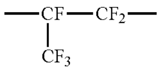 | $—CF_2—CF_2—CF_3$ | 8 | 99,263 |
| 14 | —H | $—CH_2—$ | 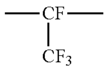 | 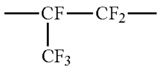 | $—CF_2—CF_2—CF_3$ | 8 | 15,940 |
| 15 | —H | $—CH_2—$ | 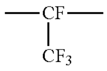 | 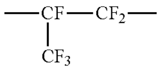 | $—CF_2—CF_2—CF_3$ | 8 | 116,890 |
| 16 | —H | $—CH_2—$ | 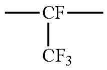 | 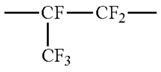 | $—CF_2—CF_2—CF_3$ | 8 | 27,585 |
| 17 | —H | $—CH_2—$ | 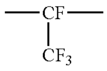 | 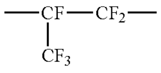 | $—CF_2—CF_2—CF_3$ | 8 | 29,864 |
| 18 | —H | $—CH_2—$ | $—CF_2—$ | $—CF_2—$ | $—CF_3$ | 3 | 17,010 |
| 19 | —H | $—CH_2—$ | $—CF_2—$ | $—CF_2—CF_2—$ | $—CF_2—CF_3$ | 5 | 23,057 |

TABLE 3-continued

| Graft copolymer No. | Structural unit represented by formula (1) R11 | R12 | Rf1 | Rf2 | Rf3 | Total number of carbon atoms of Rf1 to Rf3 | Result of GPC measurement Weight-average molecular weight |
|---|---|---|---|---|---|---|---|
| 20 | —H | $—CH_2—$ | $—CF_2—CF_2—$ | $—CF_2—CF_2—$ | $—CF_2—CF_2—CF_2—CF_3$ | 8 | 32,143 |
| 21 | —H | $—CH_2—CH_2—$ | $—CF(CF_3)—$ | $—CF(CF_3)—CF_2—$ | $—CF_2—CF_2—CF_3$ | 8 | 31,931 |
| 22 | —H | $—CH_2—CH_2—$ | $—CF_2—$ | $—CF_2—CF_2—$ | $—CF_2—CF_2—CF_2—CF_3$ | 7 | 32,335 |

<Production of Electrophotographic Photosensitive Member>

Example 1-1

(Support 1)

A product obtained by cutting a cylindrical aluminum cylinder (JIS-A3003, aluminum alloy, outer diameter: 30.6 mm, length: 370 mm, wall thickness: 1 mm) was used as a support (electroconductive support). The support was subjected to ultrasonic cleaning in a cleaning liquid obtained by incorporating a detergent (product name: CHEMICOL CT, manufactured by Tokiwa Chemical Industries Co., Ltd.) into pure water, and subsequently, the cleaning liquid was washed off. After that, the cleaned product was further subjected to ultrasonic cleaning in pure water to be subjected to degreasing treatment. The resultant was used as a support 1.

(Undercoat Layer 1)

100 Parts of zinc oxide particles (specific surface area: 19 $m^2/g$, powder resistance: $4.7\times10^6$ Ω·cm) were stirred and mixed with 500 parts of toluene, and 0.8 part of a silane coupling agent (compound name: N-2-(aminoethyl)-3-aminopropylmethyldimethoxysilane, product name: KBM-602, manufactured by Shin-Etsu Chemical Co., Ltd.) was added to the mixture, followed by stirring for 6 hours. After that, toluene was evaporated under reduced pressure, and the residue was heated and dried at 130° C. for 6 hours to provide surface-treated zinc oxide particles A.

Subsequently, 15 parts of a butyral resin (product name: BM-1, manufactured by Sekisui Chemical Company, Limited) serving as a polyol and 15 parts of a blocked isocyanate (product name: DURANATE TPA-B80E, non-volatile content: 80 mass %, manufactured by Asahi Kasei Chemicals Corporation) were dissolved in a mixed solvent containing 73.5 parts of methyl ethyl ketone and 73.5 parts of 1-butanol. 80.8 Parts of the surface-treated zinc oxide particles A and 0.81 part of 2,3,4-trihydroxybenzophenone (manufactured by Tokyo Chemical Industry Co., Ltd.) were added to the solution, and the materials were dispersed with a sand mill apparatus using glass beads each having a diameter of 0.8 mm under an atmosphere at 23° C.±3° C. for 3 hours.

After the dispersion treatment, 0.01 part of a silicone oil (product name: SH28PA, manufactured by Dow Corning Toray Co., Ltd. (former Dow Corning Toray Silicone Co., Ltd.)) and 5.6 parts of crosslinked polymethyl methacrylate (PMMA) particles (product name: TECHPOLYMER SSX-103, manufactured by Sekisui Kasei Co., Ltd., average primary particle diameter: 3 m) were added to the resultant, and the mixture was stirred to prepare a coating liquid for an undercoat layer.

The resultant coating liquid for an undercoat layer was applied onto the above-mentioned support 1 by dip coating to form a coating film, and the coating film was dried for 30 minutes at 160° C. to form an undercoat layer 1 having a thickness of 18 m.

(Charge-Generating Layer 1)

4 Parts of a hydroxygallium phthalocyanine crystal (charge-generating substance) of a crystal form having strong peaks at Bragg angles 2θ±0.2° of 7.4° and 28.1° in CuKα characteristic X-ray diffraction, and 0.04 part of a compound represented by the following formula (E) were added to a liquid obtained by dissolving 2 parts of polyvinyl butyral (product name: S-LEC BX-1, manufactured by Sekisui Chemical Company, Limited) in 100 parts of cyclohexanone. After that, the mixture was subjected to dispersion treatment with a sand mill using glass beads each having a diameter of 1 mm under an atmosphere at 23° C.±3° C. for 1 hour. After the dispersion treatment, 100 parts of ethyl acetate was added to the resultant to prepare a coating liquid for a charge-generating layer.

The coating liquid for a charge-generating layer was applied onto the undercoat layer 1 by dip coating, and the resultant coating film was dried for 10 minutes at 90° C. to form a charge-generating layer 1 having a thickness of 0.15 m.

(E)

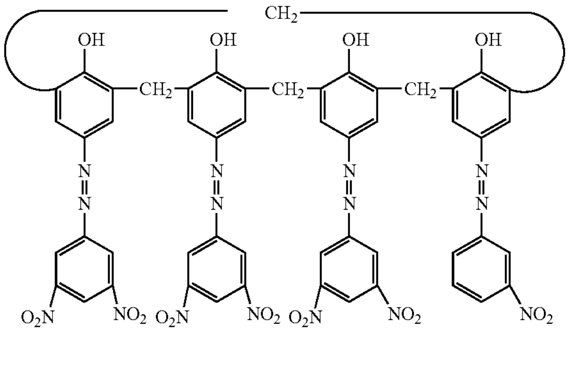

(Charge-Transporting Layer 1)

60 Parts of a compound represented by the following formula (F), 30 parts of a compound represented by the following formula (G), 10 parts of a compound represented by the following formula (H), 100 parts of a bisphenol Z type polycarbonate resin (product name: IUPILON Z400, manufactured by Mitsubishi Engineering-Plastics Corporation), and 0.2 part of polycarbonate having a unit represented by the following formula (I) (viscosity-average molecular weight Mv: 20,000) were dissolved in a mixed solvent containing 272 parts of o-xylene, 256 parts of methyl benzoate, and 272 parts of dimethoxymethane to prepare a coating liquid for a charge-transporting layer.

The coating liquid for a charge-transporting layer was applied onto the above-mentioned charge-generating layer 1 by dip coating to form a coating film, and the resultant coating film was dried for 50 minutes at 115° C. to form a charge-transporting layer 1 having a thickness of 18 m.

In the formula (I), 0.95 and 0.05 represent the molar ratios (copolymerization ratios) of the two units.

(Protective Layer)

2.20 Parts of the above-mentioned graft copolymer 1 was dissolved in a mixed solvent formed of 100 parts of 1,1,2,2-tetrafluoroethyl-2,2,2-trifluoroethyl ether (product name: AE-3000, manufactured by AGC Inc.) and 100 parts of 1-propanol to prepare a dispersant solution.

40 Parts of polytetrafluoroethylene resin particles (average primary particle diameter: 210 nm, average circularity: 0.85) were added to the resultant dispersant solution. Then, the mixture was passed through a high-pressure dispersing machine (product name: MICROFLUIDIZER M-110EH, manufactured by Microfluidics, USA) to provide a polytetrafluoroethylene resin particle dispersion liquid.

75.4 Parts of a hole-transportable compound represented by the following formula (B), 21.9 parts of a compound represented by the following formula (C), and 100 parts of 1-propanol were added to the resultant polytetrafluoroethylene resin particle dispersion liquid. After that, the mixture was filtered with a polyflon filter (product name: PF-040, manufactured by Advantec Toyo Kaisha, Ltd.) to prepare a polytetrafluoroethylene resin particle dispersion liquid (coating liquid for a protective layer).

(F)

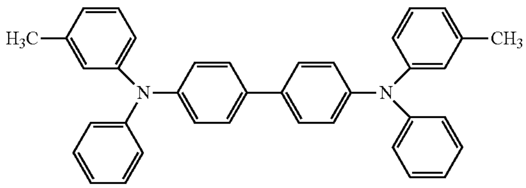

(G)

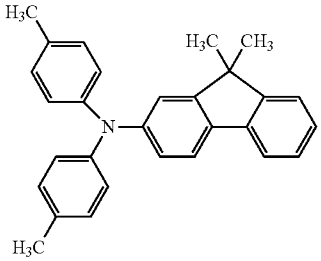

(H)

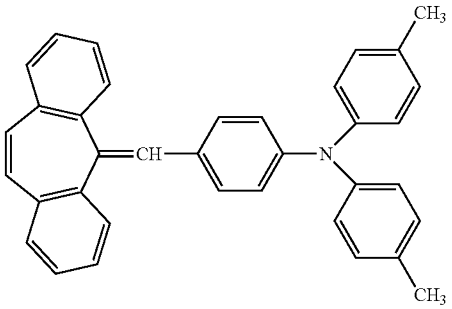

(I)

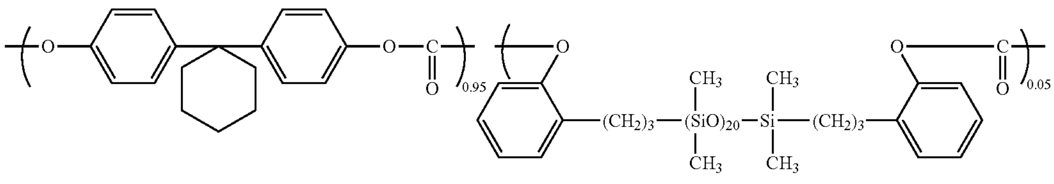

(B)

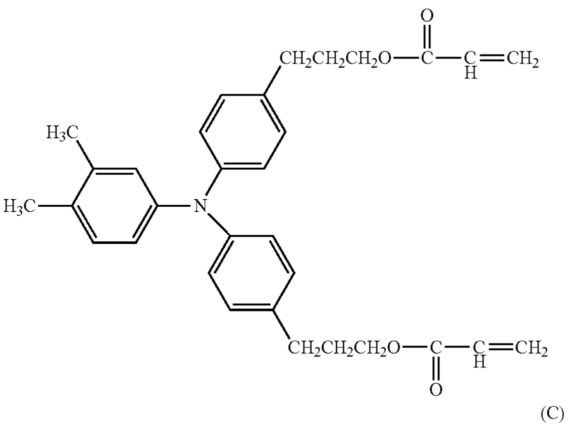

(C)

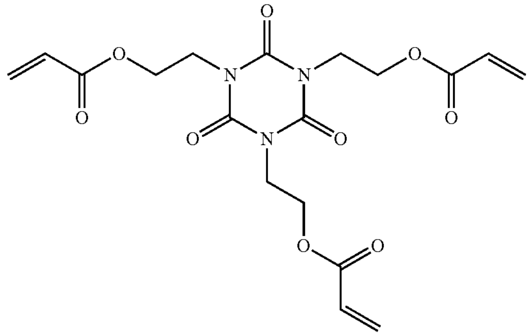

The coating liquid for a protective layer was applied onto the charge-transporting layer by dip coating to form a coating film, and the resultant coating film was dried for 5 minutes at 40° C. After the drying, under a nitrogen atmosphere, the coating film was irradiated with electron beams for 1.6 seconds under the conditions of an acceleration voltage of 70 kV and an absorbed dose of 15 kGy. After that, under the nitrogen atmosphere, the coating film was subjected to heating treatment for 15 seconds under such a condition that its temperature became 135° C. An oxygen concentration during a time period from the electron beam irradiation to the 15 seconds of heating treatment was 15 ppm. Next, in the air, the coating film was naturally cooled until its temperature became 25° C. After that, the coating film was subjected to heating treatment for 1 hour under such a condition that its temperature became 105° C. Thus, a surface layer (protective layer) having a thickness of 5 m was formed.

The content of 1,1,2,2-tetrafluoroethyl-2,2,2-trifluoroethyl ether in the surface layer was 5 ppm.

Thus, an electrophotographic photosensitive member including the support and the surface layer before its surface polishing was produced.

<Surface Processing of Electrophotographic Photosensitive Member>

(Polishing of Electrophotographic Photosensitive Member Before Surface Polishing)

The surface of the electrophotographic photosensitive member before the formation of a surface shape was polished. The polishing was performed with the polishing apparatus of FIG. 2 under the following conditions.

Feeding speed of polishing sheet; 400 mm/min

Number of revolutions of electrophotographic photosensitive member;

450 rpm

Indentation of electrophotographic photosensitive member into backup roller;

3.5 mm

Feeding direction of polishing sheet and rotation direction of electrophotographic photosensitive member; identical with each other Backup roller; outer diameter: 100 mm, Asker C hardness:

A polishing sheet A to be mounted on the polishing apparatus was produced by mixing polishing abrasive grains used in GC3000 and GC2000 manufactured by Riken Corundum Co., Ltd.

GC3000 (polishing sheet surface roughness Ra: 0.83 m)

GC2000 (polishing sheet surface roughness Ra: 1.45 m)

Polishing sheet A (polishing sheet surface roughness Ra: 1.12 m)

The time period for which the polishing was performed with the polishing sheet A was set to 20 seconds.

(Measurement of Polishing Depth L (μm))

The maximum height Rmax in accordance with JIS B 0601 1982 was measured for the electrophotographic photosensitive member after the polishing with a surface roughness measuring instrument SURFCORDER SE3500 manufactured by Kosaka Laboratory Ltd. Measurement conditions were set as described below. The measurement was performed at 3 arbitrary sites in a 5-millimeter square range, and the average of the measured values was adopted as the polishing depth L (μm). The polishing depth L of the electrophotographic photosensitive member after the surface polishing was 0.75 μm. In addition, in Examples 1-2 to 1-25 to be described later, all the polishing depths L of electrophotographic photosensitive members subjected to surface processing were 0.75 μm.

(Measurement Conditions)

Detector: R 2 μm

Stylus: A diamond stylus having a measuring force of 0.7 mN

Filter: 2CR

Cut-off value: 0.08 mm

Measurement length: 2.5 mm

Feeding speed: 0.1 mm/sec

Examples 1-2 to 1-13 and 1-22 to 1-27, and Comparative Examples 1-1 to 1-3

Electrophotographic photosensitive members were each produced in the same manner as in Example 1-1 except that in the formation of the protective layer, the graft copolymer 1 was changed to a graft copolymer shown in Table 4. The content of 1,1,2,2-tetrafluoroethyl-2,2,2-trifluoroethyl ether in the surface layer of each of the electrophotographic photosensitive members is shown in Table 4.

Examples 1-14, 1-15, 1-20, and 1-21

Electrophotographic photosensitive members were each produced in the same manner as in Example 1-1 except that in the formation of the protective layer, the amount of the graft copolymer 1 was changed to a number of parts by mass shown in Table 4. The content of 1,1,2,2-tetrafluoroethyl-2,2,2-trifluoroethyl ether in the surface layer of each of the electrophotographic photosensitive members is shown in Table 4.

Examples 1-16 to 1-19

Electrophotographic photosensitive members were each produced in the same manner as in Example 1-1 except that in the formation of the protective layer, the polytetrafluoroethylene resin particles were changed to polytetrafluoroethylene resin particles having an average primary particle diameter and an average circularity shown in Table 4. The content of 1,1,2,2-tetrafluoroethyl-2,2,2-trifluoroethyl ether in the surface layer of each of the electrophotographic photosensitive members is shown in Table 4.

TABLE 4

| | Graft copolymer No. | Number of parts by mass of graft copolymer | Average primary particle diameter [nm] of polytetrafluoroethylene particles | Average circularity of polytetrafluoroethylene particles | Content [ppm] of 1,1,2,2-tetrafluoroethyl-2,2,2-trifluoroethyl ether in surface layer |
|---|---|---|---|---|---|
| Example 1-1 | 1 | 2.20 | 210 | 0.85 | 5 |
| Example 1-2 | 2 | 2.20 | 210 | 0.85 | 5 |
| Example 1-3 | 3 | 2.20 | 210 | 0.85 | 5 |
| Example 1-4 | 4 | 2.20 | 210 | 0.85 | 4 |
| Example 1-5 | 5 | 2.20 | 210 | 0.85 | 5 |
| Example 1-6 | 6 | 2.20 | 210 | 0.85 | 5 |
| Example 1-7 | 7 | 2.20 | 210 | 0.85 | 5 |
| Example 1-8 | 8 | 2.20 | 210 | 0.85 | 3 |
| Example 1-9 | 9 | 2.20 | 210 | 0.85 | 5 |
| Example 1-10 | 10 | 2.20 | 210 | 0.85 | 5 |
| Example 1-11 | 11 | 2.20 | 210 | 0.85 | 5 |
| Example 1-12 | 12 | 2.20 | 210 | 0.85 | 5 |
| Example 1-13 | 13 | 2.20 | 210 | 0.85 | 5 |
| Example 1-14 | 1 | 1.60 | 210 | 0.85 | 5 |
| Example 1-15 | 1 | 3.20 | 210 | 0.85 | 5 |
| Example 1-16 | 1 | 2.20 | 189 | 0.87 | 5 |
| Example 1-17 | 1 | 2.20 | 247 | 0.80 | 5 |
| Example 1-18 | 1 | 2.20 | 142 | 0.85 | 5 |
| Example 1-19 | 1 | 2.20 | 352 | 0.79 | 5 |
| Example 1-20 | 1 | 0.40 | 352 | 0.79 | 5 |
| Example 1-21 | 1 | 4.40 | 352 | 0.79 | 5 |
| Example 1-22 | 14 | 4.40 | 352 | 0.79 | 3 |
| Example 1-23 | 15 | 4.40 | 352 | 0.79 | 4 |
| Example 1-24 | 16 | 4.40 | 352 | 0.79 | 4 |
| Example 1-25 | 17 | 4.40 | 352 | 0.79 | 5 |
| Example 1-26 | 18 | 4.40 | 352 | 0.79 | 5 |
| Example 1-27 | 19 | 4.40 | 210 | 0.85 | 5 |
| Comparative Example 1-1 | 20 | 2.20 | 210 | 0.85 | 5 |
| Comparative Example 1-2 | 21 | 2.20 | 210 | 0.85 | 4 |
| Comparative Example 1-3 | 22 | 2.20 | 210 | 0.85 | 5 |

Example 2-1

(Support 2)

A product obtained by cutting a cylindrical aluminum cylinder (JIS-A3003, aluminum alloy, outer diameter: 30 mm, length: 357.5 mm, wall thickness: 0.7 mm) was used as a support (electroconductive support). The support was subjected to ultrasonic cleaning in a cleaning liquid obtained by incorporating a detergent (product name: CHEMICOL CT, manufactured by Tokiwa Chemical Industries Co., Ltd.) into pure water, and subsequently, the cleaning liquid was washed off. After that, the cleaned product was further subjected to ultrasonic cleaning in pure water to be subjected to degreasing treatment. The resultant was used as a support 2.

(Undercoat Layer 2)

60 Parts of zinc oxide particles (average particle diameter: 70 nm, specific surface area: 15 $m^2/g$) were stirred and mixed with 500 parts of tetrahydrofuran, and 0.75 part of a silane coupling agent (compound name: N-2-(aminoethyl)-3-aminopropyltrimethoxysilane, product name: KBM-603, manufactured by Shin-Etsu Chemical Co., Ltd.) was added to the mixture, followed by stirring for 2 hours. After that, tetrahydrofuran was evaporated under reduced pressure, and the residue was heated and dried at 120° C. for 3 hours to provide surface-treated zinc oxide particles.

Subsequently, 25 parts of a butyral resin (product name: BM-1, manufactured by Sekisui Chemical Company, Limited) serving as a polyol and 22.5 parts of a blocked isocyanate (product name: SUMIDUR BL-3173, manufactured by Sumitomo Bayer Urethane Co., Ltd.) were dissolved in 142 parts of methyl ethyl ketone. 100 Parts of the surface-treated zinc oxide particles and 1 part of alizarin were added to the solution, and the materials were dispersed with a sand mill using glass beads each having a diameter of 1 mm for 5 hours.

After the dispersion treatment, 0.008 part of dioctyltin dilaurate and 6.5 parts of silicone resin particles (TOSPEARL 145, manufactured by GE Toshiba Silicone Co., Ltd.) were added to the resultant, and the mixture was stirred to prepare a coating liquid for an undercoat layer.

The resultant coating liquid for an undercoat layer was applied onto the above-mentioned support 2 by dip coating to form a coating film, and the coating film was dried at 190° C. for 24 minutes to form an undercoat layer 2 having a thickness of 15 m.

(Charge-Generating Layer 2)

Next, 15 parts of a chlorogallium phthalocyanine crystal having strong diffraction peaks at Bragg angles (2θ±0.2°) of at least 7.4°, 16.6°, 25.5°, and 28.3° for a CuKα characteristic X-ray, 10 parts of a vinyl chloride-vinyl acetate copolymer resin (VMCH, manufactured by Union Carbide Japan K.K.), and 300 parts of n-butyl alcohol were mixed, and the mixture was subjected to dispersion treatment with a sand mill using glass beads each having a diameter of 1 mm for 4 hours to prepare a coating liquid for a charge-generating layer.

The coating liquid for a charge-generating layer was applied onto the undercoat layer 2 by dip coating, and the resultant coating film was dried at 150° C. for 5 minutes to form a charge-generating layer 2 having a thickness of 0.2 m.

(Charge-Transporting Layer)

Next, 10 parts of polytetrafluoroethylene resin particles (average primary particle diameter: 210 nm, average circularity: 0.85), 0.50 part of the above-mentioned graft copolymer 1, and 24 parts of tetrahydrofuran were stirred and mixed for 48 hours while the temperature of the mixed liquid was kept at 20° C. Thus, a prepared liquid A was obtained.

Next, 53.2 parts of N,N'-bis(3-methylphenyl)-N,N'-diphenylbenzidine, 14.1 parts of a bisphenol Z type polycarbonate resin (viscosity-average molecular weight: 40,000), and 0.26 part of 2,6-di-t-butyl-4-methylphenol serving as an antioxidant were mixed, and 250 parts of tetrahydrofuran was mixed and dissolved in the mixture to provide a prepared liquid B.

The prepared liquid A was added to the prepared liquid B, and the liquids were stirred and mixed. After that, the mixture was passed through a high-pressure dispersing machine (product name: MICROFLUIDIZER M-110EH, manufactured by Microfluidics, USA) to provide a dispersion liquid.

After that, a fluorine-modified silicone oil (product name: FL-100, manufactured by Shin-Etsu Silicone) was added to the dispersion liquid so that its concentration became 5 ppm. The mixture was filtered with a polyflon filter (product name: PF-040, manufactured by Advantec Toyo Kaisha, Ltd.) to prepare a coating liquid for a charge-transporting layer.

The coating liquid for a charge-transporting layer was applied onto the charge-generating layer 2 by dip coating to form a coating film, and the resultant coating film was dried at 150° C. for 25 minutes to form a charge-transporting layer having a thickness of 30 m.

Thus, an electrophotographic photosensitive member was produced.

Examples 2-2 to 2-13 and 2-22 to 2-27, and Comparative Examples 2-1 to 2-3

Electrophotographic photosensitive members were each produced in the same manner as in Example 2-1 except that in the formation of the charge-transporting layer, the graft copolymer 1 was changed to a graft copolymer shown in Table 5.

Examples 2-14, 2-15, 2-20, and 2-21

Electrophotographic photosensitive members were each produced in the same manner as in Example 2-1 except that in the formation of the charge-transporting layer, the amount of the graft copolymer 1 was changed to a number of parts by mass shown in Table 5.

Examples 2-16 to 2-19

Electrophotographic photosensitive members were each produced in the same manner as in Example 2-1 except that in the formation of the charge-transporting layer, the polytetrafluoroethylene resin particles were changed to polytetrafluoroethylene resin particles having an average primary particle diameter and an average circularity shown in Table 5.

TABLE 5

| | Graft copolymer No. | Number of parts by mass of graft copolymer | Average primary particle diameter [nm] of polytetrafluoroethylene resin particles | Average circularity of polytetrafluoroethylene resin particles |
|---|---|---|---|---|
| Example 2-1 | 1 | 0.50 | 210 | 0.85 |
| Example 2-2 | 2 | 0.50 | 210 | 0.85 |
| Example 2-3 | 3 | 0.50 | 210 | 0.85 |
| Example 2-4 | 4 | 0.50 | 210 | 0.85 |
| Example 2-5 | 5 | 0.50 | 210 | 0.85 |
| Example 2-6 | 6 | 0.50 | 210 | 0.85 |
| Example 2-7 | 7 | 0.50 | 210 | 0.85 |
| Example 2-8 | 8 | 0.50 | 210 | 0.85 |
| Example 2-9 | 9 | 0.50 | 210 | 0.85 |
| Example 2-10 | 10 | 0.50 | 210 | 0.85 |
| Example 2-11 | 11 | 0.50 | 210 | 0.85 |
| Example 2-12 | 12 | 0.50 | 210 | 0.85 |
| Example 2-13 | 13 | 0.50 | 210 | 0.85 |
| Example 2-14 | 1 | 0.40 | 210 | 0.85 |
| Example 2-15 | 1 | 0.80 | 210 | 0.85 |
| Example 2-16 | 1 | 0.50 | 189 | 0.87 |
| Example 2-17 | 1 | 0.50 | 247 | 0.80 |
| Example 2-18 | 1 | 0.50 | 142 | 0.85 |
| Example 2-19 | 1 | 0.50 | 352 | 0.79 |
| Example 2-20 | 1 | 0.10 | 352 | 0.79 |
| Example 2-21 | 1 | 1.10 | 352 | 0.79 |
| Example 2-22 | 14 | 1.10 | 352 | 0.79 |
| Example 2-23 | 15 | 1.10 | 352 | 0.79 |
| Example 2-24 | 16 | 1.10 | 352 | 0.79 |
| Example 2-25 | 17 | 1.10 | 352 | 0.79 |
| Example 2-26 | 18 | 1.10 | 352 | 0.79 |
| Example 2-27 | 19 | 1.10 | 352 | 0.79 |

TABLE 5-continued

| | Graft copolymer No. | Number of parts by mass of graft copolymer | Average primary particle diameter [nm] of polytetrafluoroethylene resin particles | Average circularity of polytetrafluoroethylene resin particles |
|---|---|---|---|---|
| Comparative Example 2-1 | 20 | 2.20 | 210 | 0.85 |
| Comparative Example 2-2 | 21 | 2.20 | 210 | 0.85 |
| Comparative Example 2-3 | 22 | 2.20 | 210 | 0.85 |

<Evaluation of Electrophotographic Photosensitive Member>

The electrophotographic photosensitive members obtained in Examples 1-1 to 1-27 and 2-1 to 2-27, and Comparative Examples 1-1 to 1-3 and 2-1 to 2-3 were evaluated as described below.

[Evaluation Apparatus 1-1]

An evaluation was performed by mounting each of the electrophotographic photosensitive members produced in Examples 1-1 to 1-27 and Comparative Examples 1-1 to 1-3 on a copying machine imagePRESS C800 (product name) manufactured by Canon Inc.

More specifically, the above-mentioned evaluation apparatus was placed under an environment having a temperature of 23° C. and a relative humidity of 50% RH, and each of the produced electrophotographic photosensitive members was mounted on its process cartridge for a magenta color. The resultant was mounted on the station of the process cartridge for a magenta color, and the evaluation was performed.

[Evaluation Apparatus 1-2]

An evaluation was performed by mounting each of the electrophotographic photosensitive members produced in Examples 1-1 to 1-27 and Comparative Examples 1-1 to 1-3 on a reconstructed machine of a copying machine imagePRESS C800 (product name) manufactured by Canon Inc. The charging unit of the reconstructed machine is a charging unit of such a system as to apply a voltage obtained by superimposing an AC voltage on a DC voltage to a roller type contact charging member (charging roller), and the exposing unit thereof is an exposing unit of a laser image exposure system (wavelength: 680 nm).

More specifically, the above-mentioned evaluation apparatus was placed under an environment having a temperature of 23° C. and a relative humidity of 50% RH, and each of the produced electrophotographic photosensitive members was mounted on its process cartridge for a magenta color. The resultant was mounted on the station of the process cartridge for a magenta color, and the evaluation was performed.

With regard to charging conditions, a charging potential and the exposure amount of the exposing unit were adjusted so that a charging potential of −800 V and an exposure potential of −300 V were obtained.

The surface potential of each of the electrophotographic photosensitive members was measured by removing a cartridge for development from the above-mentioned evaluation apparatus and inserting a potential-measuring device into the resultant space. The potential-measuring device is formed by arranging a potential-measuring probe (product name: model 6000B-8, manufactured by Trek Japan) at the development position of the cartridge for development. In addition, the position of the potential-measuring probe with respect to the electrophotographic photosensitive member was set as follows: the probe was placed at a center in the generating line direction of the electrophotographic photosensitive member while being distant from the surface of the electrophotographic photosensitive member with a gap of 3 mm. Further, a potential at the central portion of the electrophotographic photosensitive member was measured with a surface potentiometer (product name: model 344, manufactured by Trek Japan).

[Evaluation Apparatus 2-1]

An evaluation was performed by mounting each of the electrophotographic photosensitive members produced in Examples 2-1 to 2-27 and Comparative Examples 2-1 to 2-3 on a copying machine imageRUNNER iR-ADV C5051 manufactured by Canon Inc.

More specifically, the above-mentioned evaluation apparatus was placed under an environment having a temperature of 23° C. and a relative humidity of 50% RH, and each of the produced electrophotographic photosensitive members was mounted on its process cartridge for a cyan color. The resultant was mounted on the station of the process cartridge for a cyan color, and the evaluation was performed.

[Evaluation Apparatus 2-2]

An evaluation was performed by mounting each of the electrophotographic photosensitive members produced in Examples 2-1 to 2-27 and Comparative Examples 2-1 to 2-3 on a reconstructed machine of a copying machine imageRUNNER iR-ADV C5051 manufactured by Canon Inc. (its charging unit was such a system as to apply a voltage obtained by superimposing an AC voltage on a DC voltage to a roller type contact charging member (charging roller), and its exposing unit was a laser image exposure system (wavelength: 780 nm)).

More specifically, the above-mentioned evaluation apparatus was placed under an environment having a temperature of 23° C. and a relative humidity of 50% RH, and each of the produced electrophotographic photosensitive members was mounted on its process cartridge for a cyan color. The resultant was mounted on the station of the process cartridge for a cyan color, and the evaluation was performed.

With regard to charging conditions, a charging potential and the exposure amount of the exposing unit were adjusted so that a charging potential of −700 V and an exposure potential of −200 V were obtained.

The surface potential of each of the electrophotographic photosensitive members was measured by removing a cartridge for development from the above-mentioned evaluation apparatus and inserting a potential-measuring device into the resultant space. The potential-measuring device is formed by arranging a potential-measuring probe (product name: model 6000B-8, manufactured by Trek Japan) at the development position of the cartridge for development. The position of the potential-measuring probe with respect to the electrophotographic photosensitive member was set as follows: the probe was placed at a center in the generating line direction of the electrophotographic photosensitive member while being distant from the surface of the electrophotographic photosensitive member with a gap of 3 mm. Further, a potential at the central portion of the electrophotographic photosensitive member was measured with a surface potentiometer (product name: model 344, manufactured by Trek Japan).

(Initial Image Evaluation)

Image evaluations were performed by using the evaluation apparatus 1-1 and the evaluation apparatus 2-1 described above. An entirely solid white image was output on A4 size gloss paper, and the number of image defects due to a dispersion failure in the area of the output image corresponding to one round of each of the electrophotographic photosensitive members, that is, black spots was visually evaluated in accordance with the following evaluation ranks. The area corresponding to one round of the electrophotographic photosensitive member is a rectangular region measuring 297 mm, which is the length of the long side of the A4 paper, in a longitudinal direction and 94.2 mm, which is one round of the electrophotographic photosensitive member, in a lateral direction. In addition, in the present disclosure, ranks A, B, C, and D were the levels at which the effect of the present disclosure was obtained, and out of the ranks, the rank A was judged to be an excellent level. Meanwhile, a rank E was judged to be the level at which the effect of the present disclosure was not obtained.

A: No black spot is present.

B: The number of black spots each having a diameter of less than 1.5 mm is from 1 to 3, and no black spot having a diameter of 1.5 mm or more is present.

C: The number of black spots each having a diameter of less than 1.5 mm is from 1 to 3, and the number of black spots each having a diameter of 1.5 mm or more is 1 or 2.

D: The number of black spots each having a diameter of less than 1.5 mm is 4 or 5, and the number of black spots each having a diameter of 1.5 mm or more is 2 or less.

E: The number of black spots each having a diameter of less than 1.5 mm is 6 or more, or the number of black spots each having a diameter of 1.5 mm or more is 3 or more.

The results of the evaluations performed as described above are shown in Table 6.

(Evaluation of Potential Fluctuation at Time of Repeated Use)

The evaluations of the potential fluctuations of the electrophotographic photosensitive members at the time of their repeated use were performed by using the evaluation apparatus 1-2 and the evaluation apparatus 2-2 described above. The cartridge including each of the electrophotographic photosensitive members was mounted on the corresponding evaluation apparatus, and the photosensitive member was repeatedly used by passing 10,000 sheets of paper. A monochromatic letter image having a print percentage of 1% was repeatedly formed on 10,000 sheets of A4 size plain paper in the station having arranged thereon the electrophotographic photosensitive member. The initial dark portion potential of the photosensitive member and the dark portion potential thereof after the repeated formation of the image on the 10,000 sheets at this time are compared to each other, and a difference therebetween is defined as a potential fluctuation value (ΔVd). In addition, the initial light portion potential thereof and the light portion potential thereof after the repeated formation of the image on the 10,000 sheets are compared to each other, and a difference therebetween is defined as a potential fluctuation value (ΔVl). After the completion of the passing of the 10,000 sheets, the evaluation apparatus was left to stand for 5 minutes, and its cartridge for development was replaced with the potential-measuring device, followed by the measurement of the light portion potential (Vlb) and dark portion potential (Vdb) of the photosensitive member after its repeated use. The difference between the dark portion potential after the repeated use and the initial dark portion potential (Vda) was defined as a dark portion potential fluctuation amount ($\Delta Vd=|Vdb|-|Vda|$). In addition, the difference between the light portion potential after the repeated use and the initial light portion potential (Vla) was defined as a light portion potential fluctuation amount ($\Delta Vl=|Vlb|-|Vla|$). In each of the evaluations with the evaluation apparatus 1-2, a light portion potential fluctuation amount at the time of the repeated use of the photosensitive member in the formation of the image on 100,000 sheets, 300,000 sheets, or 500,000 sheets was further measured. In addition, in each of the evaluations with the evaluation apparatus 2-2, a light portion potential fluctuation amount at the time of the repeated use of the photosensitive member in the formation of the image on 100,000 sheets was further measured.

In the present disclosure, a case in which a change in light portion potential was 40 V or less was the level at which the effect of the present disclosure was obtained, and out of such cases, a case in which the change in light portion potential was 15 V or less was judged to be a particularly excellent level.

The results of the evaluations performed as described above are shown in Table 6.

TABLE 6

| | Evaluation result | | | | |
|---|---|---|---|---|---|
| Example No. | Initial image | ΔV1 [V] after passing of 10,000 sheets | ΔV1 [V] after passing of 100,000 sheets | ΔV1 [V] after passing of 300,000 sheets | ΔV1 [V] after passing of 500,000 sheets |
| Example 1-1 | A | 8 | 11 | 13 | 14 |
| Example 1-2 | A | 9 | 11 | 12 | 14 |
| Example 1-3 | B | 9 | 11 | 12 | 13 |
| Example 1-4 | A | 10 | 12 | 14 | 16 |
| Example 1-5 | B | 11 | 13 | 14 | 15 |
| Example 1-6 | B | 11 | 13 | 14 | 15 |
| Example 1-7 | B | 11 | 13 | 15 | 17 |
| Example 1-8 | B | 11 | 13 | 15 | 18 |
| Example 1-9 | A | 10 | 12 | 15 | 17 |
| Example 1-10 | B | 10 | 12 | 14 | 15 |
| Example 1-11 | A | 10 | 12 | 14 | 15 |
| Example 1-12 | B | 11 | 12 | 14 | 15 |
| Example 1-13 | B | 12 | 13 | 16 | 17 |
| Example 1-14 | B | 10 | 12 | 14 | 15 |
| Example 1-15 | B | 12 | 14 | 15 | 17 |
| Example 1-16 | B | 12 | 14 | 15 | 16 |
| Example 1-17 | A | 12 | 14 | 15 | 16 |
| Example 1-18 | C | 13 | 15 | 16 | 18 |
| Example 1-19 | B | 13 | 15 | 16 | 18 |
| Example 1-20 | D | 13 | 15 | 16 | 18 |
| Example 1-21 | D | 16 | 20 | 26 | 30 |
| Example 1-22 | B | 18 | 22 | 27 | 32 |
| Example 1-23 | C | 19 | 24 | 28 | 34 |
| Example 1-24 | D | 19 | 25 | 29 | 35 |
| Example 1-25 | C | 20 | 21 | 30 | 36 |
| Example 1-26 | D | 20 | 21 | 31 | 37 |
| Example 1-27 | C | 22 | 24 | 35 | 40 |
| Comparative Example 1-1 | C | 31 | 38 | 42 | 45 |

TABLE 6-continued

| | | Evaluation result | | | |
|---|---|---|---|---|---|
| Example No. | Initial image | ΔV1 [V] after passing of 10,000 sheets | ΔV1 [V] after passing of 100,000 sheets | ΔV1 [V] after passing of 300,000 sheets | ΔV1 [V] after passing of 500,000 sheets |
| Comparative Example 1-2 | E | 30 | 38 | 41 | 42 |
| Comparative Example 1-3 | C | 32 | 38 | 41 | 41 |
| Example 2-1 | A | 10 | 13 | — | — |
| Example 2-2 | A | 11 | 13 | — | — |
| Example 2-3 | B | 11 | 13 | — | — |
| Example 2-4 | A | 12 | 14 | — | — |
| Example 2-5 | B | 11 | 13 | — | — |
| Example 2-6 | B | 11 | 13 | — | — |
| Example 2-7 | B | 13 | 15 | — | — |
| Example 2-8 | B | 13 | 15 | — | — |
| Example 2-9 | A | 12 | 14 | — | — |
| Example 2-10 | B | 12 | 14 | — | — |
| Example 2-11 | A | 12 | 14 | — | — |
| Example 2-12 | B | 13 | 14 | — | — |
| Example 2-13 | B | 14 | 15 | — | — |
| Example 2-14 | B | 12 | 14 | — | — |
| Example 2-15 | B | 14 | 16 | — | — |
| Example 2-16 | B | 14 | 16 | — | — |
| Example 2-17 | A | 14 | 16 | — | — |
| Example 2-18 | C | 16 | 18 | — | — |
| Example 2-19 | B | 16 | 18 | — | — |
| Example 2-20 | D | 17 | 19 | — | — |
| Example 2-21 | D | 18 | 22 | — | — |
| Example 2-22 | B | 22 | 26 | — | — |
| Example 2-23 | C | 23 | 27 | — | — |
| Example 2-24 | D | 25 | 28 | — | — |
| Example 2-25 | C | 26 | 29 | — | — |
| Example 2-26 | D | 26 | 30 | — | — |
| Example 2-27 | C | 28 | 34 | — | — |
| Comparative Example 2-1 | C | 33 | 43 | — | — |
| Comparative Example 2-2 | E | 35 | 44 | — | — |
| Comparative Example 2-3 | C | 32 | 42 | — | — |

While the present disclosure has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2021-157318, filed Sep. 28, 2021, and Japanese Patent Application No. 2022-020563, filed Feb. 14, 2022, which are hereby incorporated by reference herein in their entirety.

What is claimed is:

1. An electrophotographic photosensitive member comprising a surface layer, wherein the surface layer comprises a fluorine atom-containing resin particle, a binder material that is a cured product of a hole-transportable compound having a chain-polymerizable functional group, a compound represented by the following formula (3), and a polymer A having a structural unit represented by the following formula (1), and wherein the polymer A is free of a structural unit having an acidic group having a pKa of 3 or less:

(1)

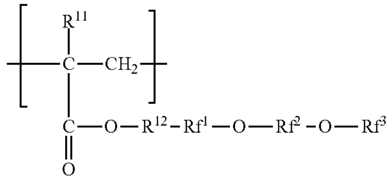

where, in formula (1), $R^{11}$ represents a hydrogen atom or a methyl group, $R^{12}$ represents a single bond or a methylene group, $Rf^1$ and $Rf^2$ each independently represent a perfluoroalkylene group having 1 to 3 carbon atoms, or a perfluoroalkylidene group having 1 to 3 carbon atoms, and $Rf^3$ represents a perfluoroalkyl group having 1 to 3 carbon atoms, $$R^{31}—O—R^{32} \quad (3)$$

where, in formula (3), $R^{31}$ represents an alkyl group or a fluoroalkyl group, and $R^{32}$ represents a fluoroalkyl group.

2. The electrophotographic photosensitive member according to claim 1, wherein a total number of the carbon atoms of $Rf^1$ to $Rf^3$ in formula (1) is from 6 to 9.

3. The electrophotographic photosensitive member according to claim 1, wherein a content of the structural unit represented by formula (1) in the polymer A is from 5 number % to 95 number % with respect to all structural units in the polymer A.

4. The electrophotographic photosensitive member according to claim 1, wherein a content of the structural unit represented by formula (1) in the polymer A is from 0.1 mass % to 80 mass % with respect to all structural units in the polymer A.

5. The electrophotographic photosensitive member according to claim 1, wherein the polymer A has a weight-average molecular weight of from 16,000 to 100,000.

6. The electrophotographic photosensitive member according to claim 1, wherein a content of the polymer A in the surface layer is from 2 mass % to 10 mass % with respect to a mass of the fluorine atom-containing resin particle in the surface layer.

7. The electrophotographic photosensitive member according to claim 1, wherein the polymer A further has a structural unit represented by the following formula (2):

(2)

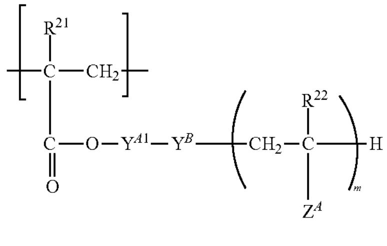

where, in formula (2), $Y^{A1}$ represents an unsubstituted alkylene group, $Y^B$ represents an unsubstituted alkylene group, an alkylene group substituted with a halogen atom, an alkylene group substituted with a hydroxy group, an ester bond (—COO—), an amide bond (—NHCO—), or a urethane bond (—NHCOO—), or a divalent linking group that may be derived by combining one or more kinds selected from these groups and bonds, and —O— or —S—, or a single bond, $Z^4$ represents a structure represented by the following formula (2A), a cyano group, or a phenyl group, $R^{21}$ and $R^{22}$ each independently represent a hydrogen atom or a methyl group, and m represents an integer of from 25 to 150;

(2A)

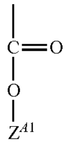

where, in formula (2A), $Z^{41}$ represents an alkyl group having 1 to 4 carbon atoms.

8. The electrophotographic photosensitive member according to claim 7, wherein the polymer A has only the structural unit represented by formula (1) and the structural unit represented by formula (2) as structural units thereof.

9. The electrophotographic photosensitive member according to claim 7, wherein a ratio between the structural unit represented by formula (1) and the structural unit represented by formula (2) in the polymer A is from 1:19 to 19:1 in terms of molar ratio.

10. The electrophotographic photosensitive member according to claim 1, wherein a content of the fluorine atom-containing resin particle in the surface layer is from 5 mass % to 40 mass % with respect to a total mass of the surface layer.

11. The electrophotographic photosensitive member according to claim 1, wherein the hole-transportable compound having a chain-polymerizable functional group is a compound represented by the following formula (CT-1) or (CT-2):

(CT-1)

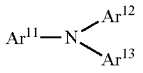

where, in formula (CT-1), $Ar^{11}$ to $Ar^{13}$ each independently represent a substituted aryl group or an unsubstituted aryl group, and a substituent that the substituted aryl group may have is an alkyl group having 1 to 6 carbon atoms, or a monovalent functional group represented by any one of the following formulae (P-1) to (P-3), provided that the compound represented by formula (CT-1) has at least one monovalent functional group represented by any one of the following formulae (P-1) to (P-3);

(CT-2)

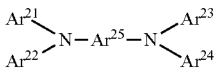

where, in formula (CT-2), $Ar^{21}$ to $Ar^{24}$ each independently represent a substituted aryl group or an unsubstituted aryl group, $Ar^{25}$ represents a substituted arylene group or an unsubstituted arylene group, a substituent that the substituted aryl group may have is an alkyl group having 1 to 6 carbon atoms, or a monovalent functional group represented by any one of the following formulae (P-1) to (P-3), and a substituent that the substituted arylene group may have is an alkyl group having 1 to 6 carbon atoms, or a monovalent functional group represented by any one of the following formulae (P-1) to (P-3), provided that the compound represented by formula (CT-2) has at least one monovalent functional group represented by any one of the following formulae (P-1) to (P-3);

(P-1)

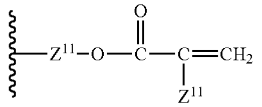

where, in formula (P-1), $Z^{11}$ represents a single bond or an alkylene group having 1 to 6 carbon atoms, and $X^{11}$ represents a hydrogen atom or a methyl group;

(P-2)

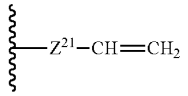

where, in formula (P-2), $Z^{21}$ represents a single bond or an alkylene group having 1 to 6 carbon atoms;

(P-3)

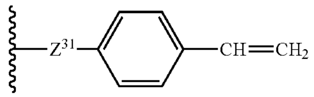

where, in formula (P-3), $Z^{31}$ represents a single bond or an alkylene group having 1 to 6 carbon atoms.

12. The electrophotographic photosensitive member according to claim 1, wherein a content of the fluorine atom-containing resin particle in the surface layer is from 20 mass % to 40 mass % with respect to a total mass of the surface layer.

13. A process cartridge comprising:

an electrophotographic photosensitive member; and at least one unit selected from the group consisting of: a charging unit; a developing unit; and a cleaning unit, the process cartridge integrally supporting the electrophotographic photosensitive member and the at least one unit, and being detachably attachable to a main body of an electrophotographic apparatus, the electrophotographic photosensitive member comprising a surface layer, wherein the surface layer comprises a fluorine atom-containing resin particle, a binder material that is a cured product of a hole-transportable compound having a chain-polymerizable functional group, a compound represented by the following formula (3), and a polymer A having a structural unit represented by the following formula (1), and wherein the polymer A is free of a structural unit having an acidic group having a pKa of 3 or less:

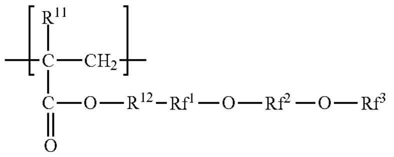

(1)

where, in formula (1), $R^{11}$ represents a hydrogen atom or a methyl group, $R^{12}$ represents a single bond or a methylene group, $Rf^1$ and $Rf^2$ each independently represent a perfluoroalkylene group having 1 to 3 carbon atoms, or a perfluoroalkylidene group having 1 to 3 carbon atoms, and $Rf^3$ represents a perfluoroalkyl group having 1 to 3 carbon atoms, $R^{31}—O—R^{32}$ (3)

where, in formula (3), $R^{31}$ represents an alkyl group or a fluoroalkyl group, and $R^{32}$ represents a fluoroalkyl group.

14. An electrophotographic apparatus comprising:

an electrophotographic photosensitive member;

a charging unit;

an exposing unit;

a developing unit; and a transferring unit, the electrophotographic photosensitive member comprising a surface layer, wherein the surface layer comprises a fluorine atom-containing resin particle, a binder material that is a cured product of a hole-transportable compound having a chain-polymerizable functional group, a compound represented by the following formula (3), and a polymer A having a structural unit represented by the following formula (1), and wherein the polymer A is free of a structural unit having an acidic group having a pKa of 3 or less:

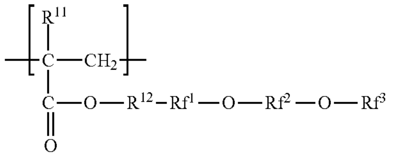

(1)

where, in formula (1), $R^{11}$ represents a hydrogen atom or a methyl group, $R^{12}$ represents a single bond or a methylene group, $Rf^1$ and $Rf^2$ each independently represent a perfluoroalkylene group having 1 to 3 carbon atoms, or a perfluoroalkylidene group having 1 to 3 carbon atoms, and $Rf^3$ represents a perfluoroalkyl group having 1 to 3 carbon atoms, $R^{31}—O—R^{32}$ (3)

where, in formula (3), $R^{31}$ represents an alkyl group or a fluoroalkyl group, and $R^{32}$ represents a fluoroalkyl group.

15. An electrophotographic photosensitive member comprising a surface layer, wherein the surface layer comprises a fluorine atom-containing resin particle, a binder material, a compound represented by the following formula (3), and a polymer A having a structural unit represented by the following formula (1), and wherein the binder material is a cured product of a hole-transportable compound having a chain-polymerizable functional group:

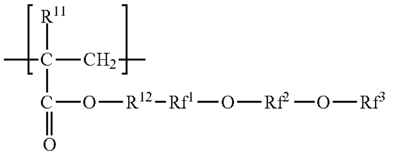

(1)

where, in formula (1), $R^{11}$ represents a hydrogen atom or a methyl group, $R^{12}$ represents a single bond or a methylene group, $Rf^1$ and $Rf^2$ each independently represent a perfluoroalkylene group having 1 to 3 carbon atoms, or a perfluoroalkylidene group having 1 to 3 carbon atoms, and $Rf^3$ represents a perfluoroalkyl group having 1 to 3 carbon atoms, $R^{31}—O—R^{32}$ (3)

where, in formula (3), $R^{31}$ represents an alkyl group or a fluoroalkyl group, and $R^{32}$ represents a fluoroalkyl group.

16. The electrophotographic photosensitive member according to claim 15, wherein the hole-transportable compound having a chain-polymerizable functional group is a compound represented by the following formula (CT-1) or (CT-2):

(CT-1)

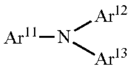

where, in formula (CT-1), $Ar^{11}$ to $Ar^{13}$ each independently represent a substituted aryl group or an unsubstituted aryl group, and a substituent that the substituted aryl group may have is an alkyl group having 1 to 6 carbon atoms, or a monovalent functional group represented by any one of the following formulae (P-1) to (P-3), provided that the compound represented by formula (CT-1) has at least one monovalent functional group represented by any one of the following formulae (P-1) to (P-3);

(CT-2)

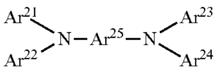

where, in formula (CT-2), $Ar^{21}$ to $Ar^{24}$ each independently represent a substituted aryl group or an unsubstituted aryl group, $Ar^{25}$ represents a substituted arylene group or an unsubstituted arylene group, a substituent that the substituted aryl group may have is an alkyl group having 1 to 6 carbon atoms, or a monovalent functional group represented by any one of the following formulae (P-1) to (P-3), and a substituent that the substituted arylene group may have is an alkyl group having 1 to 6 carbon atoms, or a monovalent functional group represented by any one of the following formulae (P-1) to (P-3), provided that the compound represented by formula (CT-2) has at least one monovalent functional group represented by any one of the following formulae (P-1) to (P-3);

(P-1)

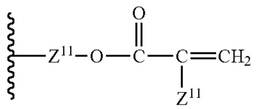

where, in formula (P-1), $Z^{11}$ represents a single bond or an alkylene group having 1 to 6 carbon atoms, and $X^{11}$ represents a hydrogen atom or a methyl group;

(P-2)

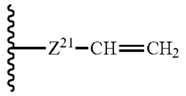

where, in formula (P-2), $Z^{21}$ represents a single bond or an alkylene group having 1 to 6 carbon atoms;

(P-3)

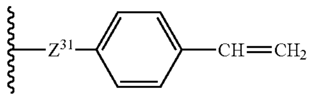

where, in formula (P-3), $Z^{31}$ represents a single bond or an alkylene group having 1 to 6 carbon atoms.

17. The electrophotographic photosensitive member according to claim 15, wherein a content of the fluorine atom-containing resin particle in the surface layer is from 20 mass % to 40 mass % with respect to a total mass of the surface layer.

18. A process cartridge comprising:

an electrophotographic photosensitive member; and at least one unit selected from the group consisting of: a charging unit; a developing unit; and a cleaning unit, the process cartridge integrally supporting the electrophotographic photosensitive member and the at least one unit, and being detachably attachable to a main body of an electrophotographic apparatus, the electrophotographic photosensitive member comprising a surface layer, wherein the surface layer comprises a fluorine atom-containing resin particle, a binder material, a compound represented by the following formula (3), and a polymer A having a structural unit represented by the following formula (1), and wherein the binder material is a cured product of a hole-transportable compound having a chain-polymerizable functional group:

(1)

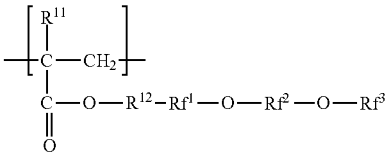

where, in formula (1), $R^{11}$ represents a hydrogen atom or a methyl group, $R^{12}$ represents a single bond or a methylene group, $Rf^1$ and $Rf^2$ each independently represent a perfluoroalkylene group having 1 to 3 carbon atoms, or a perfluoroalkylidene group having 1 to 3 carbon atoms, and $Rf^3$ represents a perfluoroalkyl group having 1 to 3 carbon atoms, $$R^{31}—O—R^{32} \quad (3)$$

where, in formula (3), $R^{31}$ represents an alkyl group or a fluoroalkyl group, and $R^{32}$ represents a fluoroalkyl group.

19. An electrophotographic apparatus comprising:

an electrophotographic photosensitive member;

a charging unit;

an exposing unit;

a developing unit; and a transferring unit, the electrophotographic photosensitive member comprising a surface layer, wherein the surface layer comprises a fluorine atom-containing resin particle, a binder material, a compound represented by the following formula (3), and a polymer A having a structural unit represented by the following formula (1), and wherein the binder material is a cured product of a hole-transportable compound having a chain-polymerizable functional group:

(1)

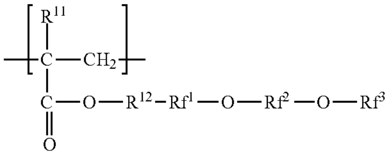

where, in formula (1), $R^{11}$ represents a hydrogen atom or a methyl group, $R^{12}$ represents a single bond or a methylene group, $Rf^1$ and $Rf^2$ each independently represent a perfluoroalkylene group having 1 to 3 carbon atoms, or a perfluoroalkylidene group having 1 to 3 carbon atoms, and $Rf^3$ represents a perfluoroalkyl group having 1 to 3 carbon atoms, $$R^{31}—O—R^{32} \quad (3)$$

where, in formula (3), $R^{31}$ represents an alkyl group or a fluoroalkyl group, and $R^{32}$ represents a fluoroalkyl group.

* * * * *